US012617489B2

(12) United States Patent
Korngold

(10) Patent No.: US 12,617,489 B2
(45) Date of Patent: May 5, 2026

(54) STAGGERED AXIS SIDECAR

(71) Applicant: V-CYCLE GLOBAL, LLC, Austin, TX (US)

(72) Inventor: Dor Korngold, Austin, TX (US)

(73) Assignee: V-CYCLE GLOBAL, LLC, Austin, TX (US)

( * ) Notice: Subject to any disclaimer, the term of this patent is extended or adjusted under 35 U.S.C. 154(b) by 0 days.

(21) Appl. No.: 18/592,178

(22) Filed: Feb. 29, 2024

(65) Prior Publication Data

US 2024/0343339 A1     Oct. 17, 2024

Related U.S. Application Data

(63) Continuation-in-part of application No. 29/930,076, filed on Feb. 27, 2024, and a continuation-in-part of (Continued)

(51) Int. Cl.
B62K 27/12     (2006.01)
B60L 53/30     (2019.01)
B62K 27/02     (2006.01)

(52) U.S. Cl.
CPC .............. B62K 27/12 (2013.01); B60L 53/30 (2019.02); B62K 27/02 (2013.01); *B60L 2200/12* (2013.01)

(58) Field of Classification Search
CPC .......... B62K 27/12; B62K 27/02; B62K 7/04; B60L 53/30; B60L 2200/12; B62J 7/00; B62J 7/04; B62J 7/08
See application file for complete search history.

(56) References Cited

U.S. PATENT DOCUMENTS

| D43,678 S | 3/1913 | Rogers |
| 1,343,440 A | 6/1920 | Easting |

(Continued)

FOREIGN PATENT DOCUMENTS

| CA | 2282150 A1 * | 3/2001 | ............. B62K 27/12 |
| CN | 85204203 | 11/1986 | |

(Continued)

OTHER PUBLICATIONS

Espace translation of WO 2006 097000 A1 (Year: 2006).*

(Continued)

*Primary Examiner* — Jason D Shanske
*Assistant Examiner* — Scott Lawrence Strickler
(74) *Attorney, Agent, or Firm* — Definitive Patents, member Synchrony IP; Timothy D. Snowden; Yau H. Chan

(57)     ABSTRACT

Apparatus and associated methods relate to a multi-axial offset side car. In an illustrative example, the side car may include a wheel with an axis of rotation along an axis adjacent to and between a front wheel axis of rotation of a vehicle and a rear wheel axis of rotation of the vehicle. Some embodiments may include a configuration where the axis of rotation of the wheel is centered below a center of a rear wheel axis of rotation of the vehicle. The sidecar frame may be coupled to a vehicle frame by at least three arms. The configuration of the placement of the axis of rotation of the side car wheel between the axis of rotation of the front and back wheel of the vehicle may advantageously prevent tipping and instability. Various embodiments may improve the suspension of the vehicle-side car system.

25 Claims, 35 Drawing Sheets

Related U.S. Application Data application No. 29/875,869, filed on May 11, 2023, now Pat. No. Des. 1,060,140, said application No. 29/930,076 is a continuation-in-part of application No. 29/875,869, filed on May 11, 2023, now Pat. No. Des. 1,060,140.

(60) Provisional application No. 63/496,625, filed on Apr. 17, 2023.

(56) References Cited

U.S. PATENT DOCUMENTS

| | | | | |
|---|---|---|---|---|
| D57,335 S | | 3/1921 | Harley | |
| D58,037 S | | 5/1921 | Lemieux et al. | |
| D150,433 S | | 8/1948 | Lockman | |
| D158,453 S | | 5/1950 | Glamb | |
| D176,660 S | | 1/1956 | Gamaunt | |
| 2,809,052 A | * | 10/1957 | Gleissner | B62K 27/00 |
| | | | | 280/304 |
| D188,755 S | | 9/1960 | Fogle | |
| 3,415,539 A | | 12/1968 | Stevens | |
| 3,596,500 A | | 8/1971 | Rees | |
| 3,704,899 A | | 12/1972 | Clem | |
| D237,601 S | | 11/1975 | Lund | |
| 3,941,405 A | * | 3/1976 | Vetter | B62K 27/00 |
| | | | | 280/203 |
| D244,365 S | | 5/1977 | Wallick | |
| D244,844 S | | 6/1977 | Vetter | |
| D245,410 S | | 8/1977 | Kellogg | |
| D256,450 S | | 8/1980 | Wallick | |
| 4,385,770 A | * | 5/1983 | Mitchell | B62K 5/10 |
| | | | | 280/203 |
| D272,997 S | | 3/1984 | Anderson | |
| D280,396 S | | 9/1985 | Sontag | |
| D316,236 S | | 4/1991 | Hannigan | |
| 5,292,142 A | * | 3/1994 | Vitarelli | B62K 27/02 |
| | | | | 280/203 |
| D578,441 S | | 10/2008 | Kajitori | |
| 2002/0074763 A1 | | 6/2002 | Mixer | |
| 2003/0057674 A1 | | 3/2003 | Lopez | |
| 2019/0389532 A1 | | 12/2019 | Choi et al. | |
| 2022/0266707 A1 | * | 8/2022 | Treadway | B60L 53/16 |

FOREIGN PATENT DOCUMENTS

| | | | | |
|---|---|---|---|---|
| CN | 2051953 | 1/1990 | | |
| CN | 203681770 | 7/2014 | | |
| JP | 2008222136 A | 9/2008 | | |
| JP | 4763482 B2 | 8/2011 | | |
| JP | 5159881 B2 | * | 3/2013 | B62K 27/00 |
| WO | WO-2006097000 A1 | * | 9/2006 | B62K 27/14 |
| WO | WO-2013095101 A1 | * | 6/2013 | B62K 27/12 |
| WO | 2013114119 A1 | 8/2013 | | |

OTHER PUBLICATIONS

Espace translation of JP 5159881 B2 (Year: 2013).*
Amazon, Thule Pack 'n Pedal Tour Rack Gepäckträger, Accessed: Feb. 28, 2023, https://www.amazon.com/Thule-Pack-Pedal-Tour-Rack/dp/B01N6RORTM?th=1.
Amazon.com, Topeak MTX Rear Bicycle Basket : Sports & Outdoors, Accessed: Feb. 28, 2023, https://www.amazon.com/Topeak-882104-Rear-Bicycle-Basket/dp/B000F16WXQ?th=1&psc=1.
Freewheelin E-Bikes, Freewheelin Ebikes And Outdoors, retrieved from the internet, https://freewheelinebikes.com/.
KLICKfix | GTA, Accessed: Feb. 28, 2023, https://klickfix.com/en/systems/gta.
KLICKfix | Home, Accessed: Feb. 28, 2023, https://klickfix.com/en/.
KLICKfix | KorbKlip, Accessed: Feb. 28, 2023, https://klickfix.com/en/systems/korbklip.
KLICKfix | Rackpack, Accessed: Feb. 28, 2023, https://klickfix.com/en/systems/rackpack.
KLICKfix | Racktim, Accessed: Feb. 28, 2023, https://klickfix.com/en/systems/racktime.
KLICKfix | UniKlip, Accessed: Feb. 28, 2023, https://klickfix.com/en/systems/uniklip.
Mobicity, "Simply Plus—Simple & low cost : manual lock and charge," Accessed: Feb. 27, 2023, https://www.mobicity.fr/index.php?page=produit-det&type=simply-plus.
MOD Bikes, MOD Easy—Electric Bike with Sidecar, retrieved from the internet, https://web.archive.org/web/20230317222539/https://mod-bikes.com/products/mod-easy-electric-cruiser-bike-and-sidecar.
MOD Bikes, MOD Easy SideCar, retrieved from the internet, https://web.archive.org/web/20220923220903/https://mod-bikes.com/products/mod-easy-electric-cruiser-bike-and-sidecar.
Turvec, "E-Bike Charging Station." Accessed: Feb. 27, 2023, https://turvec.com/wp-content/uploads/2021/03/Turvec_E-Bike_Charging_Station_Data_Sheet.pdf.
WayBack Machine, Calendar Map View, retrieved from the internet, https://web.archive.org/web/20230515000000*/https://mod-bikes.com/products/mod-easy-electric-cruiser-bike-and-sidecar.
Wicked Thumb, Ebike Sidecars, retrieved from the internet, https://wickedthumb.com/collections/sidecars.
Wicked Thumb, Wicked Thumb BLVD w/ Sidecar Ebike, retrieved from the internet, https://wickedthumb.com/products/blvd-sidecar.
Wicked Thumb, Wicked Thumb Destroyer w/ Sidecar, retrieved from the internet, https://wickedthumb.com/products/wicked-thumb-destroyer-sidecar.
Wicked Thumb, Wicked Thumb Rat w/Sidecar Ebike, retrieved from the internet, https://wickedthumb.com/products/wicked-thumb-rat-sidehack.
Wicked Thumb, Wicked Thumb Sidecar w/mounting kit *Bike Sold Separately*, retrieved from the internet, https://wickedthumb.com/products/sidecaronly.
Amazon.com, Thule Tour Rack—Bike Cargo Rack—Easy on Easy Off—Front and Rear Compatible : Everything Else, Accessed: Feb. 28, 2023, https://www.amazon.com/Thule-Pack-Pedal-Tour-Rack/dp/B01N6RORTM/ref=sr_1_27?content-id=amzn1.sym.9575273b-ecd8-4648-9bf0-15f20c657e0a&keywords=qr%2Bbeam%2Brack%2Bmtx&pd_rd_r=8234aabb-5833-4b52-9034-4fbe4cd13b60&pd_rd_w=d78Kl&pd_rd_wg=l47q0&pf_rd_p=9575273b-ecd8-4648-9bf0-15f20c657e0a&pf_rd_r=0KM7HKNCVE4EAMK2T3A6&qid=1677534982&sr=8-27&th=1.
"eAhora M1P Sidecar Electric Motorcycle for Adult, 2000W Motor 37mph, . . . Full Suspension and Hydraulic Brakes, 2 Person Ride." Amazon., Jan. 28, 2024 [online], [retrieved on Oct. 28, 2024]. Retrieved from the Internet <URL: https://www.amazon.com/eAhora-Electric-Motorcycle-Suspension-Hydraulic/dp/BOCNYYZ1RN/-.
"Learn How to Ride the MOD Easy SideCar." YouTube., Jul. 13, 2022 [online], [retrieved on Oct. 28, 2024]. Retrieved from the Internet <URL: https://www.youtube.com/watch?v =-MVGalvJRmc>.
"MOD Easy Sidecar Assembly Guide 2023." YouTube., Dec. 5, 2023 [online], [retrieved on Oct. 28, 2024]. Retrieved from the Internet <URL: https://www.youtube.com/watch?v=bHyONHJZL9w>.
"MOD Easy SideCar Electric Cruiser Packs a Lot. Retro-Looking Package." Autoevolution., Sep. 6, 2022 [online], [retrieved on Oct. 28, 2024]. Retrieved from the Internet <URL: https://www.autoevolution.com/news/ mod-easy-sidecar-electric-cruiser-packs-a-lot-of-muscle-in-a-cool-retro-looking-package-197885.html>.
"The Mod Easy Sidecar electric bike carries a passenger the fun, old-fashioned way." electrek., Sep. 5, 2022 [online], [retrieved on Oct. 28, 2024]. Retrieved from the Internet <URL: https://electrek.co/2022/09/05/modbikes-easy-sidecar-electric-bike/>.
Notice of Allowance dated Jan. 20, 2026 for U.S. Appl. No. 29/930,076 (pp. 1-8).

* cited by examiner

800

805

805

800

810

900

910

915

1000

1005

1110

STAGGERED AXIS SIDECAR

CROSS-REFERENCE TO RELATED APPLICATIONS

This application is a Continuation-in-Part and claims the benefit of U.S. Design Application Ser. No. 29/930,076, titled "Bicycle Sidecar," filed by Dor Korngold on Feb. 27, 2024, which application and this application are each a Continuation-in-Part and claim the benefit of U.S. Design Application Ser. No. 29/876,869, titled "Add-On Side Car," filed by Dor Korngold on May 11, 2023.

This application also claims the benefit of U.S. Provisional Application Ser. No. 63/496,625, titled "Electric Bicycle System," filed by Dor Korngold on Apr. 17, 2023.

This application incorporates the entire contents of the foregoing applications herein by reference.

TECHNICAL FIELD

Various embodiments relate generally to vehicles, side cars, and vehicle accessories.

BACKGROUND

Sidecars are a fascinating blend of functionality and heritage, providing a unique solution to expand the utility of two-wheeled vehicles like motorcycles, bicycles, and e-bikes. They serve as a bridge between the solitary experience of riding and the need for carrying additional passengers or cargo, without significantly compromising the original vehicle's agility and performance. This addition transforms a standard bike or motorcycle into a versatile transport option, suitable for a range of activities from daily commutes to adventurous explorations.

Electric bikes, also known as e-bikes, are bicycles equipped with an integrated electric motor which can offer pedal assistance or full electric propulsion, making them a versatile option for commuting, recreational cycling, and mountain biking, as well as an eco-friendly solution to reduce carbon footprint. They can be broadly categorized into pedal-assist, where the rider must pedal to activate the motor for additional power, and throttle-controlled e-bikes, which allow motor activation without pedaling.

SUMMARY

Apparatus and associated methods relate to a multi-axial offset side car. In an illustrative example, the side car may include a wheel with an axis of rotation along an axis adjacent to and between a front wheel axis of rotation of a vehicle and a rear wheel axis of rotation of the vehicle. Some embodiments may include a configuration where the axis of rotation of the wheel is centered below a center of a rear wheel axis of rotation of the vehicle. The sidecar frame may be coupled to a vehicle frame by at least three arms. The configuration of the placement of the axis of rotation of the side car wheel between the axis of rotation of the front and back wheel of the vehicle may advantageously prevent tipping and instability. Various embodiments may improve the suspension of the vehicle-side car system.

In some embodiments, one of the at least three arms may, for example, terminate in a rotatable socket. One of the at least three arms may be adjustable in length. Two of the at least three arms may be lower arms. The at least two lower arms may extend from the side car frame along a first axis for a first distance, and then along a second axis, intersecting the first axis, for a second distance, such that, for the second distance, the lower arms angle upward toward a mounting point on the vehicle.

Apparatus, associated methods and systems relate to an accessory rack. The accessory rack may, for example, be configured to the vehicle couple to the side. The accessory mounting rack may be configured to be coupled to a frame of a cycling vehicle. The accessory rack includes a multi-modal rack defining a flat surface. The accessory rack includes a mounting plate including a plurality of keyhole apertures all aligned to operably engage in a single direction. The multi-modal rack may be configured into a cargo mode to receive a load. The multi-modal rack may be configured into an accessory mode having an auto-locking protrusion configured such that, when a corresponding multiple mounting studs of a mountable accessory is brought into register with and inserted through entry points of the multiple keyhole apertures, the studs are operated in a single direction for a distance where at least one keyhole slot is shorter than a length of the rack, then the auto-locking protrusion registers with and is urged into locking engagement with a corresponding locking feature on the mounting plate.

In some embodiments, the accessory mounting rack may, for example, further include a second locking protrusion configured such that, when the auto-locking protrusion is engaged with the corresponding locking feature on the mounting plate, then the second locking protrusion is selectively key-operable into a locked mode in which the second locking protrusion engages a corresponding second locking feature of the mounting plate such that the accessory mounting rack is prevented from being operated in a direction opposite the single direction.

The accessory rack may, for example, advantageously allow a user to configure a bag to the rear of their vehicle. The vehicle may, for example, be configured to a side car while using the accessory rack. The side car may, for example, provide additional stability to the bike, which may allow a user to carry bulkier items on the accessory rack. using a side car.

In some embodiments, the side car is releasably coupled to the vehicle frame. The vehicle may, for example, include an electric motor vehicle. The vehicle may, for example, include bicycles and motor cycles. The electric vehicle configured to the side car may, for example, be configured to be received into a charging station.

Apparatus, associated methods and systems relate to charging station. The charging station includes a pedestal defining a stowage cavity. The charging station includes a power outlet disposed in the stowage cavity. The charging station includes a door hingedly coupled to the pedestal and configured to selectively close up the stowage cavity. The charging station includes a locking mechanism. The locking mechanism includes a first protrusion extending from the pedestal in a first plane and defining a first aperture. The locking mechanism includes a second protrusion extending from the stowage cavity in a second plane and defining a second aperture. For example, when the door is closing the stowage cavity, the first aperture and the second aperture are aligned and the first plane is parallel to the second plane. A third protrusion hingedly may be coupled to the pedestal along a different axis of rotation then the door defining a third aperture is configured such that, when the door is closing the stowage cavity, the first protrusion, and the second protrusion project through the third aperture substantially against opposite sides of the third aperture such that, when an lock is passed through the first and second aperture, the third protrusion is prevented from being hingedly operated sufficiently to permit hinged operation of the door sufficient to open the cavity.

Various embodiments may achieve one or more advantages. For example, some embodiments may the chagrining station locking mechanism may, for example, prevent tampering with the vehicle's bike chain coupled to the chagrining station while stationed. Some embodiments may, for example, prevent tampering with the electrical cable with the electric vehicle while charging. In some embodiments, the charging station may, for example, include a predetermined storage area for side cars.

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

Figure 1A:
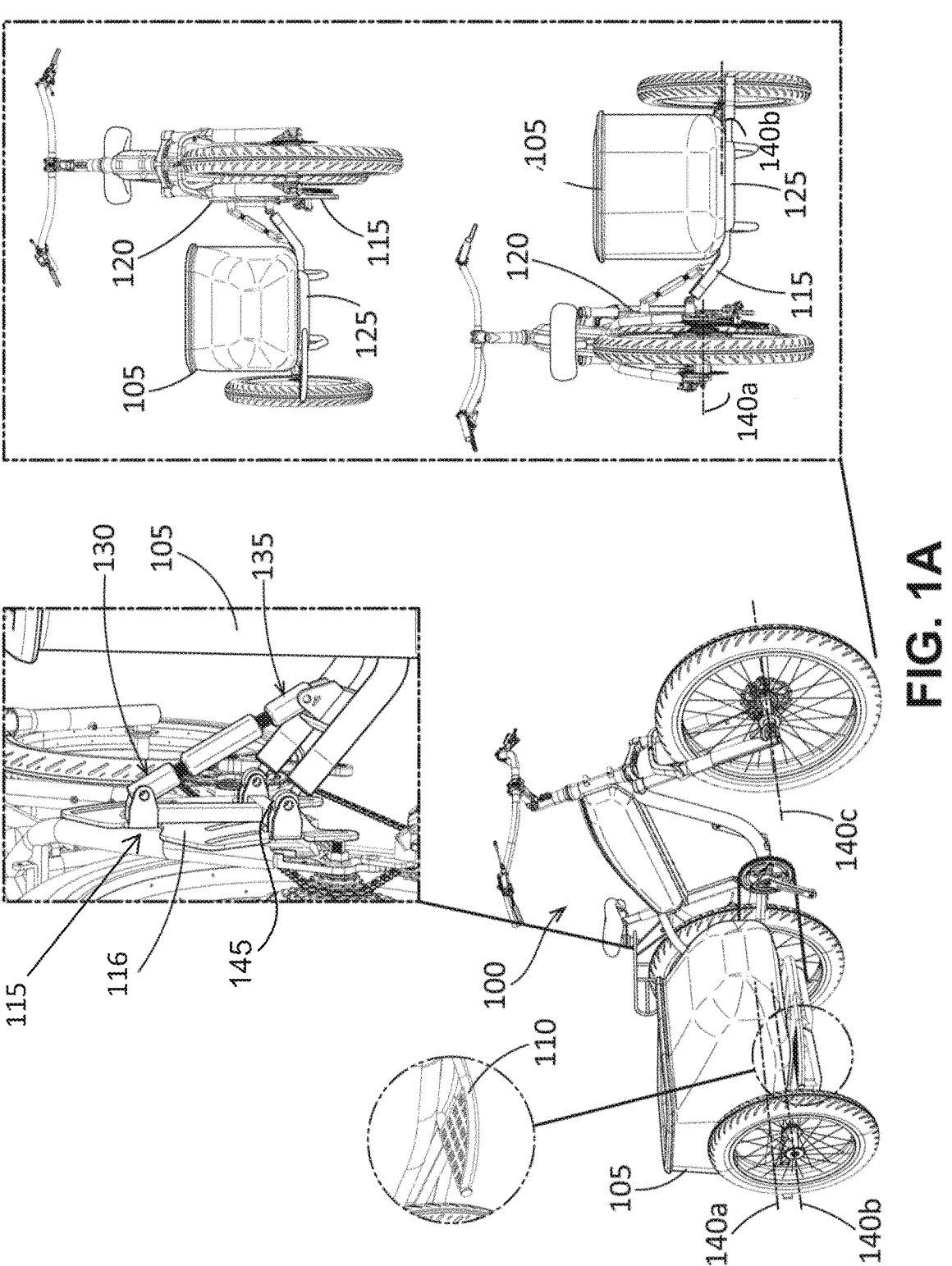
FIG. 1A depicts an exemplary side car employed in an illustrative use-case scenario.

FIG. 1A depict an exemplary electric bicycle side car (EBSC) coupled to an exemplary multi-purpose electric bicycle (MPEB). For example, the MPEB 100 may be secured to the EBDS 200. For example, the MPEB 100 may be charged by the EBDS 200.

As shown in FIG. 1A, the MPEB 100 is releasably coupled to a stability enhanced side car (SESC 105). For example, the SESC 105 may be configured to carry an extra person with the MPEB 100. For example, the SESC 105 may be configured as a pet carrier traveling along with the MPEB 100. In some implementations, the SESC 105 may be made with aluminum. For example, the SESC 105 may be made with aluminum alloy. In some implementations, the SESC 105 may be made with plastic.

In this example, the SESC 105 includes a mounting step 110. For example, the mounting step may advantageously allow easy entrance into the SESC 105.

As shown in FIG. 1A, the SESC 105 is coupled to the MPEB 100 using a stability enhanced side car connection system (SESCCS 115). In this example, a mounting bracket 116 of the SESCCS 115 is tilted slightly downward. For example, the SESCCS 115 may connect the SESC 105 to be lower than a frame 120 of the MPEB 100. The SESC 105 connects the frame 120 to a base 125 of the SESC 105. For example, a lower position of the SESC 105 may advantageously provide a lower center of gravity. For example, the lower center of gravity may enhance stability of the SESC 105 when the MPEB 100 is in motion.

FIG. 1A depicts an exemplary stability enhanced side car connection system (SESCCS). In this example, a SESCCS may include a three point locking system at the frame 120 of the MPEB 100. The SESCCS 115 may include, as depicted, the mounting bracket 116 (e.g., a single mounting bracket as shown). The SESCCS 115 may, for example, include a telescoping arm 130 with ends 135. The arm may, for example, be the upper arm. For example, the three point locking system may be fixedly coupled to the base 125 of the SESC 105. For example, the three point locking system may improve security and safety of the connection between the MPEB 100 and the SESC 105.

Figure 1B:
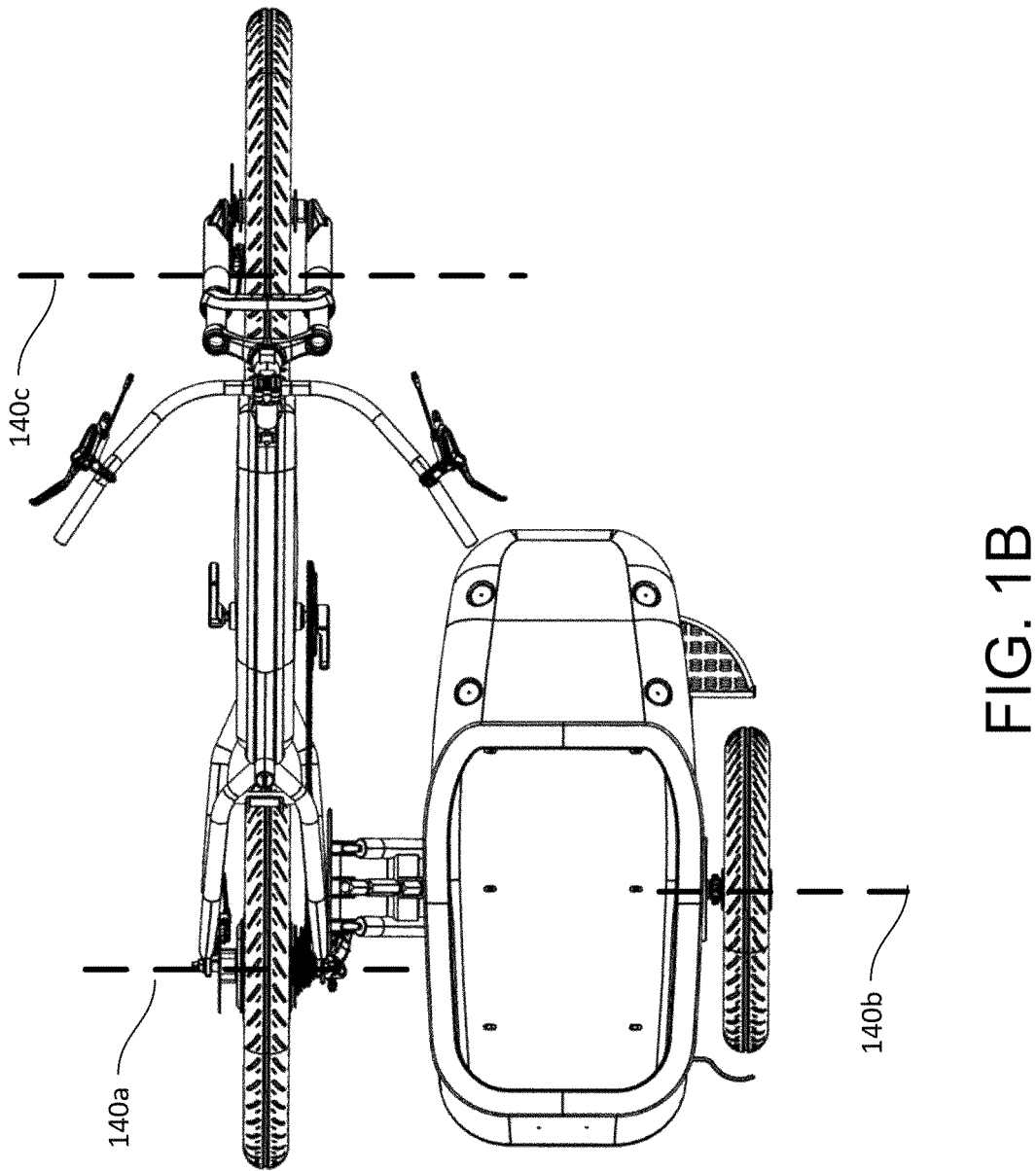
FIG. 1B depicts a schematic of an exemplary side car.

FIG. 1A-B depicts a schematic of an exemplary side car. The vehicle includes 2 wheels. The rear wheel includes an axis of rotation 140a. The side car wheel includes an axis of rotation 140b. The front wheel includes an axis of rotation 140c. The axis of rotations are centered on the wheel. The axis of rotation 140b of the side car wheel is situated between the axis of rotation of the front wheel 140c and the axis of rotation of the rear wheel 140a along the longitudinal direction of the vehicle. The height of the axis of rotation for the side car wheel 140b is situated at and/or below the height of the axis of rotation of the front wheel 140c and/or the rear wheel 140a. The axis of rotation of the rear wheel 140c and the axis of rotation of the front wheel 140c may, for example, have the same height. The wheels of the front wheel and the rear wheel may, for example, be the same.

Figure 2:
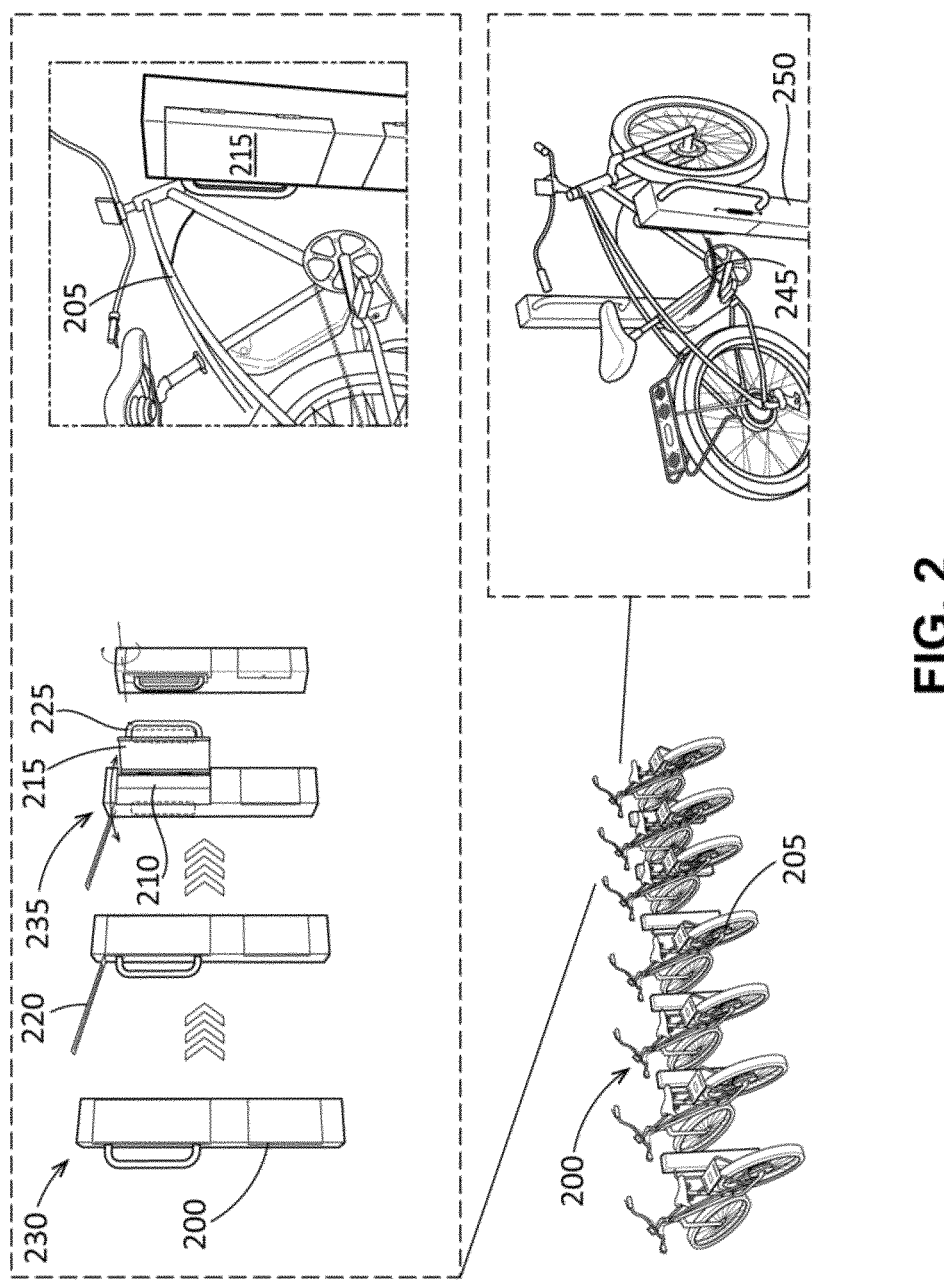
FIG. 2 depicts an exemplary charging station employed in an illustrative use case scenario.

FIG. 2 depict an exemplary electric bicycle docking system (EBDS) employed in an illustrative use-case scenario. In an example shown in FIG. 2, an EBDS 200 are each connected to an electric bike 205. For example, the electric bike 205 may be locked to the EBDS 200. For example, the electric bike 205 may receive power from the EBDS 200.

In some examples, the electric bike 205 may receive power from the EBDS 200 via a charger (not shown). For example, the charger may convert alternating current (AC)

power received from the EBDS 200 into direct current (DC) power for charging the electric bike 205. For example, the charger may be susceptible to damage in inclement weather (e.g., thunderstorm, snowstorm, heavy rain). In some examples, the charger may also be at risk of theft.

As shown in FIG. 2, the EBDS 200 includes a securable storage compartment 210 accessible through a door 215. In this example, from a closed scenario 230, the securable storage compartment 210 is accessible by lifting a locking plate 220. After the locking plate 220 is lifted above a door handle 225, the door 215 may be opened (as shown in opened scenario 235).

In some implementations, the door 215 may be secured with a bike lock. After the door is secured, for example, the securable storage compartment 210 may provide a secured space for the charger and other valuable items.

FIG. 2 depicts an exemplary bicycle locking system of an exemplary EBDS. As shown, the electric bike 205 is secured to the EBDS 200 using a bike lock. In some implementations, the door 215 may also be secured by the bike lock. Accordingly, for example, the EBDS 200 may advantageously secure the electric bike 205 and also accessories of the electric bike 205 in the securable storage compartment 210 using a single bike lock. For example, the securable storage compartment 210 may store the charger. In some implementations, the securable storage compartment 210 may also advantageously protect a battery of the electric bike 205 against weather damage.

In some examples, the securable storage compartment 210 may also store personal valuables for a bike owner (e.g., a phone, helmet). In some implementations, the securable storage compartment 210 may also provide a space for charging electronics for the bike owner while securing the electronics against theft.

Figures 3A, 3B, 3C:
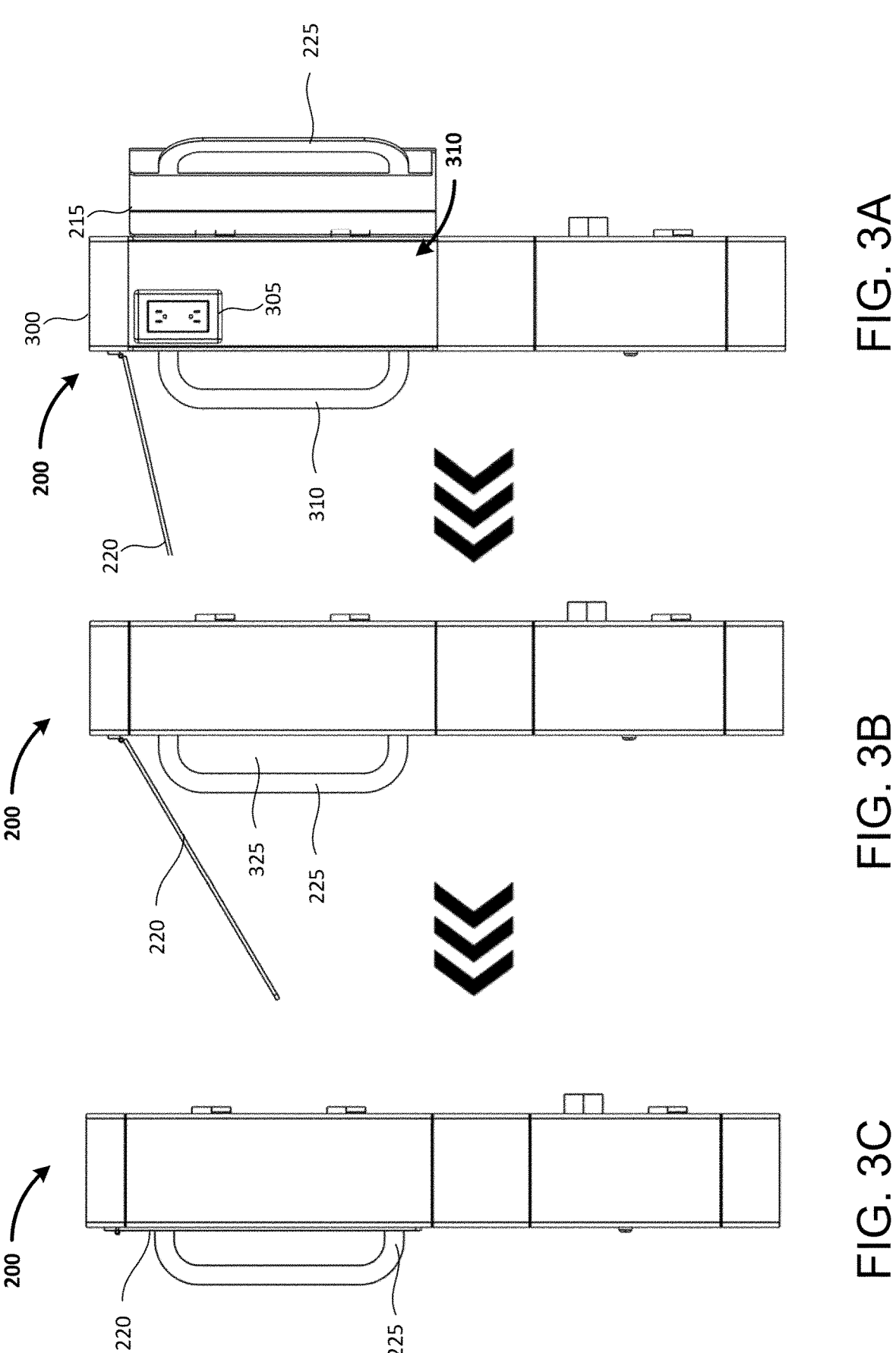
FIGS. 3A, FIG. 3B, FIG. 3C, FIG. 3D, and FIG. 3E are schematic diagrams showing an exemplary EBDS charging station.

FIG. 3A, FIG. 3B, FIG. 3C, FIG. 3D, and FIG. 3E are schematic diagrams showing an exemplary EBDS. (e.g., the EBDS 200). In this example, as shown in FIG. 3A, the EBDS 200 includes a charging pedestal 300. For example, a user may use the charging pedestal 300 to charge an electric bicycle. The charging pedestal 300 includes an electric power source 305. For example, the electric power source 305 may be a pluggable receptacle. For example, the electric power source 305 may electrically be coupled to a power source (e.g., electrical power grid, a central power bank).

The electric power source 305 is disposed, in this example, within the securable storage compartment 210 in the charging pedestal 300. As shown in FIG. 3C, the door 215 is hingedly coupled to the charging pedestal 300 to provide selective access to the electric power source 305. When the door 215 is closed over the securable storage compartment 210 of the charging pedestal 300 as shown in FIGS. 3B-C, the door 215 may prevent access to the electric power source 305.

In this example, the door 215 includes a door handle 225. The door handle 225, for example, may have a fin with an aperture. For example, the door handle 225 may extend off of a side of the door 215. The charging pedestal 300 includes a matching fin 310. For example, the matching fin 310 may include a fin with a matching aperture to the door handle 225. For example, the matching fin 310 may be a locking member to be used with the door handle 225. In this example, the matching fin 310 extends from a side of the charging pedestal 300.

As shown, the locking plate 220 may be hingedly coupled to the charging pedestal 300. For example, when the door 215 is closed, the door handle 225 and the matching fin 310 of the charging pedestal 300 are brought against each other. In some implementations, the door handle 225 and the matching fin 310 may be parallel when door 215 is closed. As shown in FIG. 3B, a matching aperture 325 may be jointly created by the aperture of the door handle 225 and the matching fin 310.

Figure 3D:
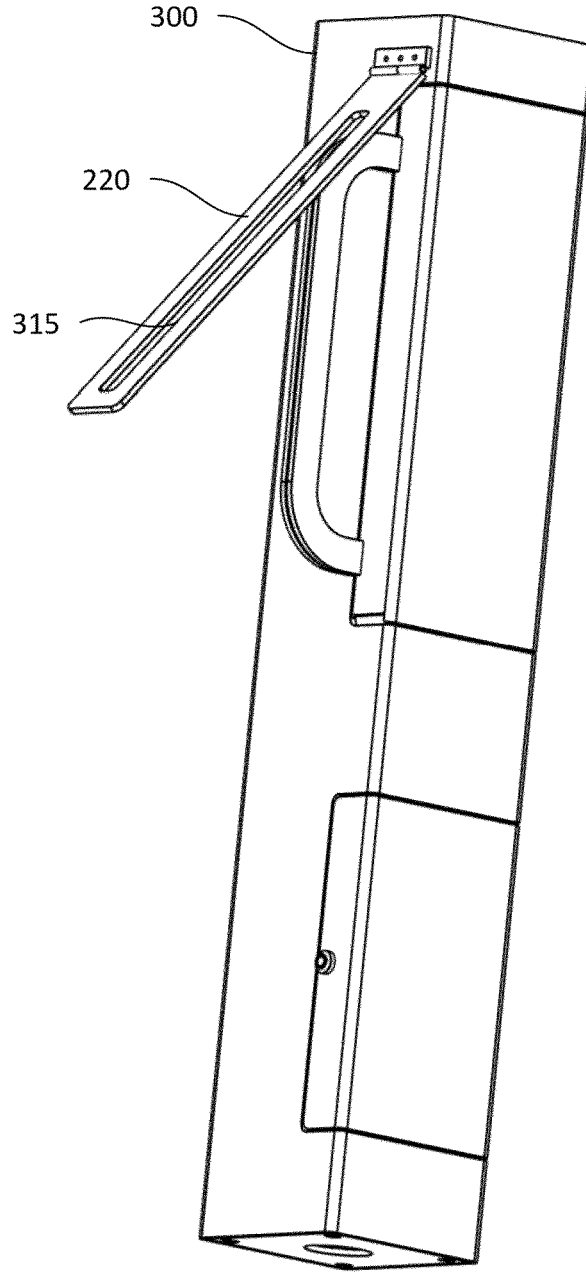

The locking plate 220 includes an aperture 315 (as shown in FIG. 3D). After the door 215 is closed, for example, when the locking plate 220 is swung down, the aperture 315 may pass over the door handle 225 and the matching fin 310 as shown in FIG. 3C. Accordingly, for example, the locking plate 220 may advantageously prevent unintended separation of the door 215 and the charging pedestal 300. For example, a bicycle lock may be passed through the apertures in the door handle 225 and the matching fin 310. For example, the bicycle lock may then prevent the locking plate 220 from being lifted. For example, the door 215 may be locked and closed against the charging pedestal 300.

In some implementations, a user may lock and charge an electric bicycle at the same time by plugging in a charger to the electric power source 305 in the securable storage compartment 210, closing the door 215, operating the locking plate 220 to be closed, and locking their bicycle to the matching fin 310 and the door handle 225. Accordingly, for example, the user may advantageously secure the bicycle and the charger of the bicycle with a single lock.

In some embodiments, the securable storage compartment 210 secured by the locking door may be sized to receive accessories. For example, a user may place a riding helmet and/or a mobile device (e.g., for charging) in the locked chamber. Accordingly, for example, a single lock may be used to secure a charging electric bicycle (e.g., at a workplace, at a public place, at a charging station).

In some implementations, an EBDS 200 may include a built-in charger 250. For example, a user may lock the electric bike 205 to the EBDS 200 and charge the electric bike 205 using a charging cable 245 of the EBDS 200. For example, the EBDS 200 may advantageously be smaller in size.

Figure 3E:
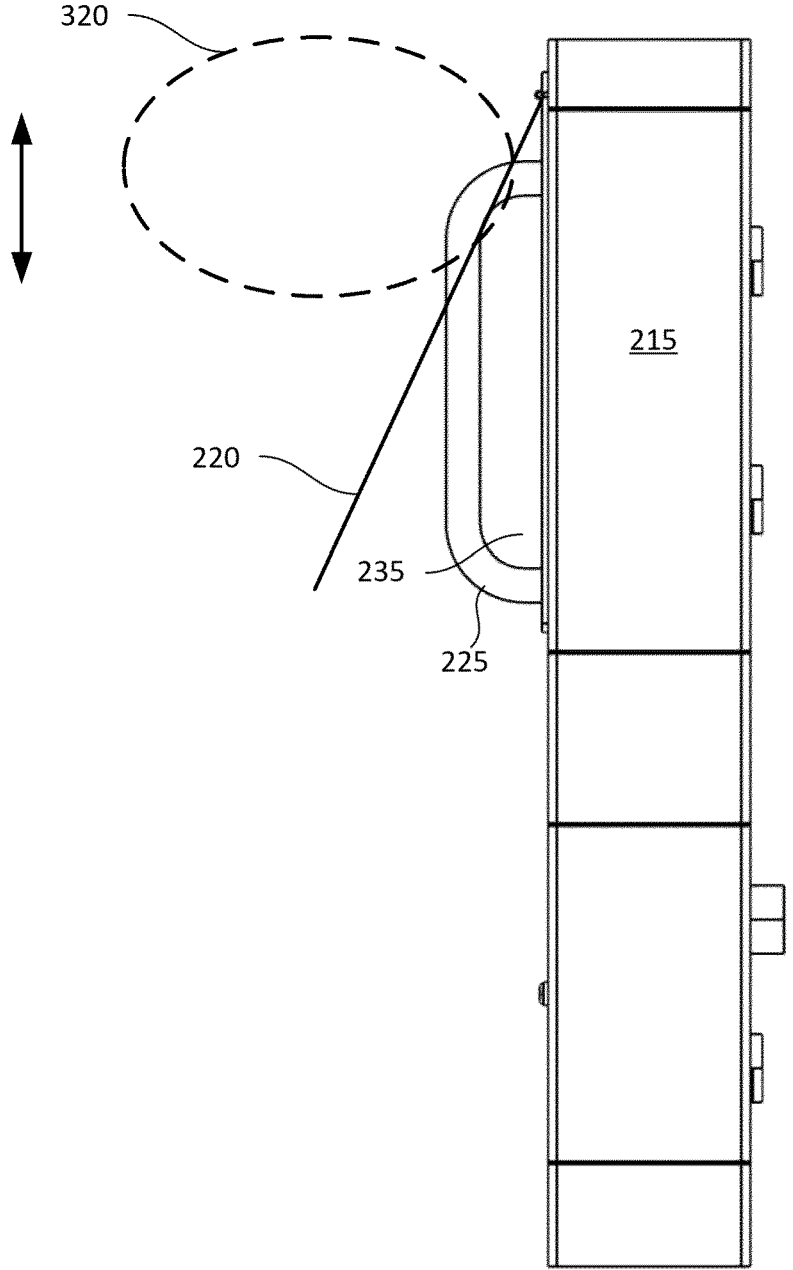

As shown in FIG. 3E, the door 215 is closed against the charging pedestal 300 with the locking plate 220 swung down and secured by a bicycle chain 320 (e.g., a bicycle lock cable). For example, the bicycle chain 320 may prevent the locking plate 220 from being lifted away from the door handle 225 and the matching fin 310. In this example, a limited vertical movement may be allowed for the bicycle chain 320 within the matching aperture 325 of the door 215 and the matching fin 310 (as shown in FIG. 3A). Accordingly, the locking plate 220 may prevent unauthorized opening of the door 215 by vertical movement of the bicycle chain 320.

In various implementations, the EBDS 200 may include a first loop (e.g., the door handle 225) extending from the door 215 and a second loop (e.g., the matching fin 310) extending from the charging pedestal 300. In some implementations, when the first loop and the second loop are brought into register such that they are in parallel planes, and a bicycle lock is passed through both loops, the bicycle lock may lock the door 215 and the bicycle to the charging pedestal (EBDS 200). In some implementations, the EBDS 200 may include a third plate (e.g., the locking plate 220) having a third loop that hinged down over both of the door handle 225 and the matching fin 310. For example, when the third plate is hinged down, rotation movements of the door 215 may be prevented.

For example, the third plate may be prevented from being lifted when the bicycle lock is in place. In some implementations, the third plate locking over the first loop and the second loop may advantageously allow application of a bigger loop for locking a bicycle (e.g., using a long bicycle chain). For example, the third plate may prevent unauthorized opening of the door by vertical movement of the long bicycle chain.

FIGS. 4A-4G are schematic diagrams showing a front perspective view, a back perspective view, a back elevation view, a left side elevation view, a right side elevation view, a top plan view, and a bottom plan view, respectively of the EBDS 200 as described with reference to FIGS. 3A-E.

Figures 4A, 4B, 4C:
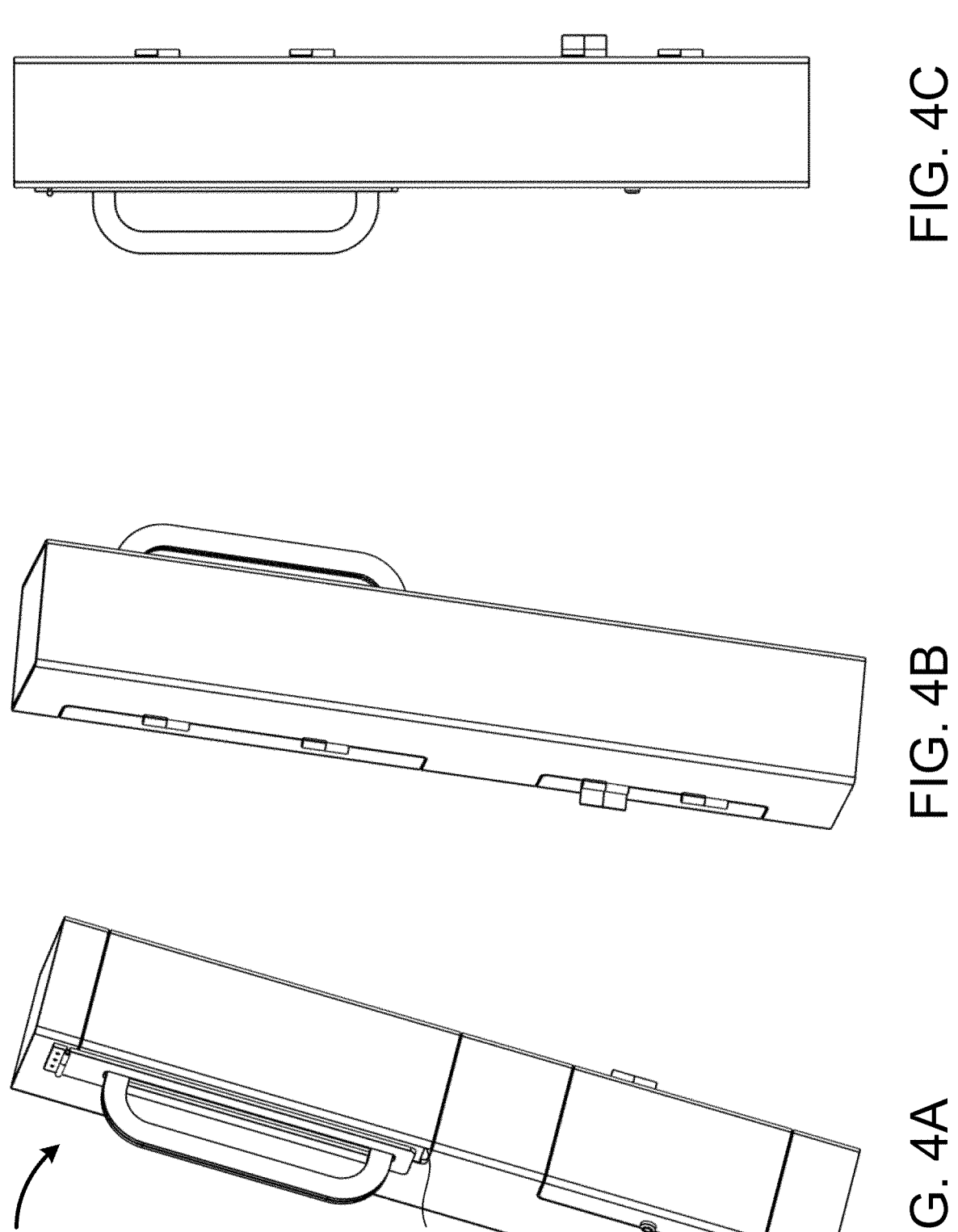
FIG. 4A, FIG. 4B, FIG. 4C, FIG. 4D, FIG. 4E, FIG. 4F, and FIG. 4G are schematic diagrams showing a front perspective view, a back perspective view, a back elevation view, a left side elevation view, a right side elevation view, a top plan view, and a bottom plan view, respectively of the EBDS as described with reference to FIGS. 3A-E.
Figure 4E:
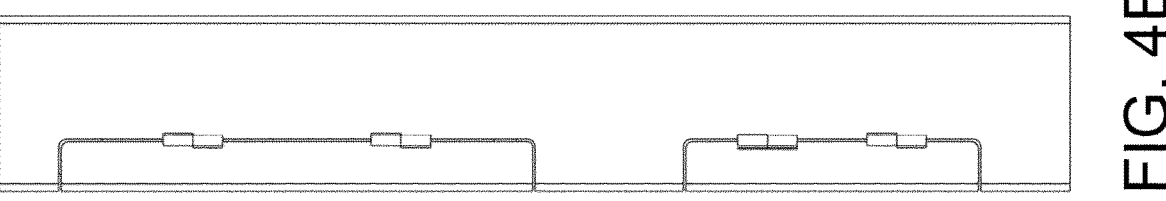
Figure 4D:
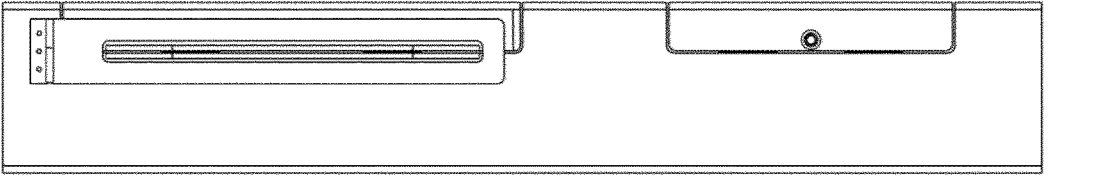
Figure 4F:
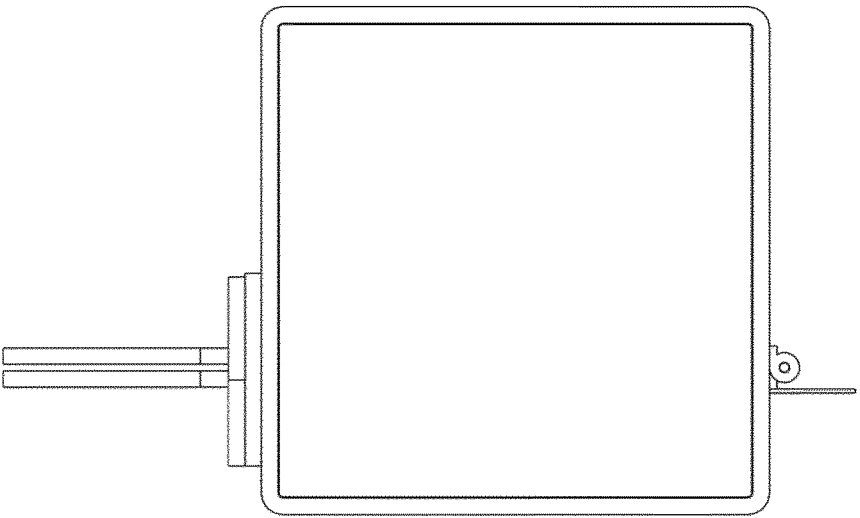
Figure 4G:
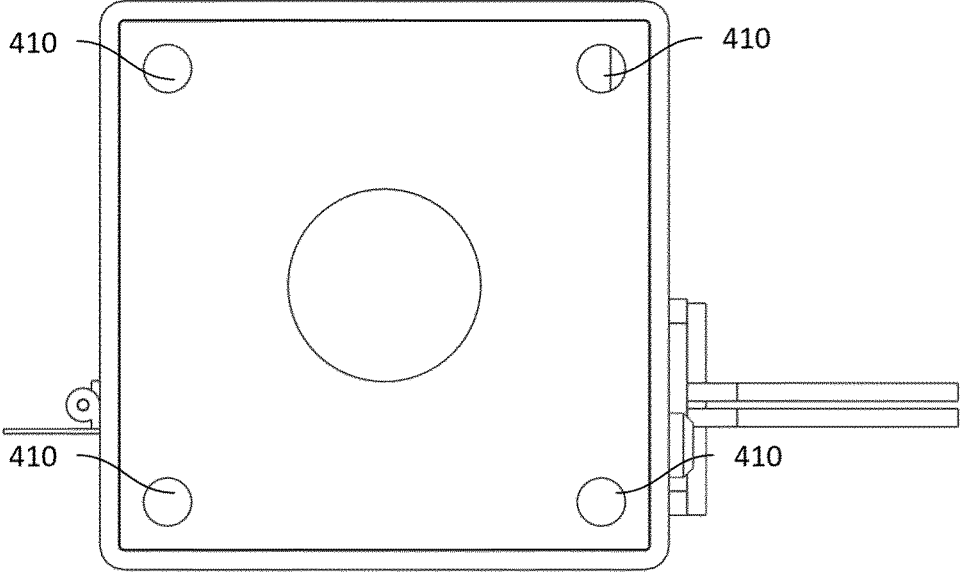
Figure 5B:
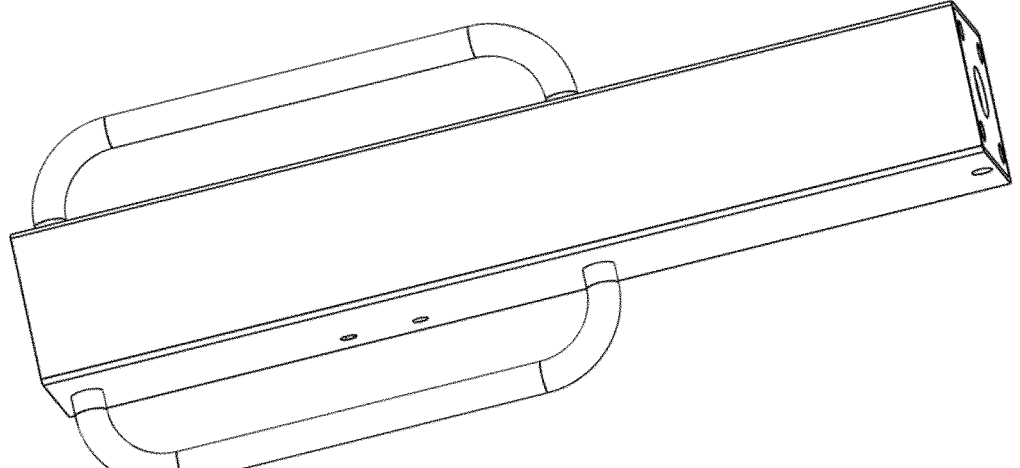
FIG. 5A, FIG. 5B, FIG. 5C, FIG. 5D, FIG. 5E, FIG. 5F, FIG. 5G, and FIG. 5H are schematic diagrams showing a front perspective view, a back perspective view, a front elevation view, a back elevation view, a left side elevation view, a right side elevation view, a top plan view, and a bottom plan view, respectively of the second embodiment of the EBDS charging station as described with reference to FIG. 2.
Figure 5A:
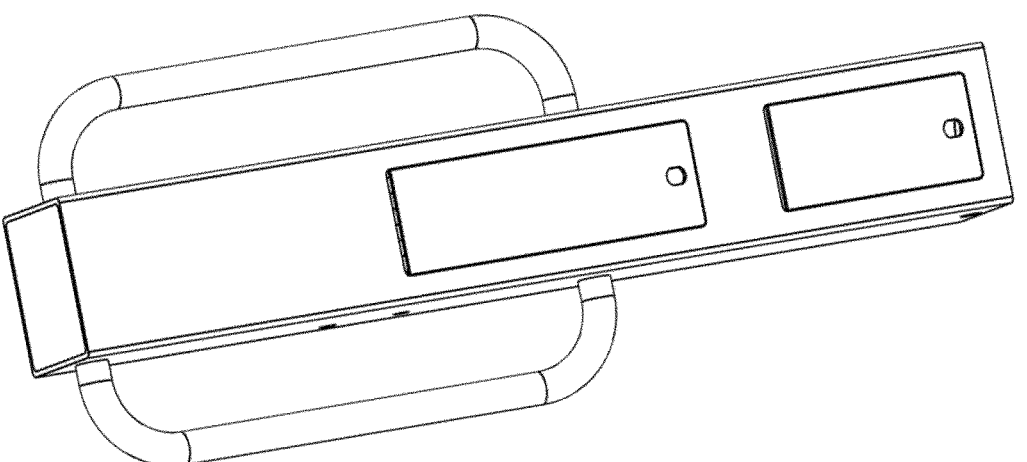
Figure 5D:
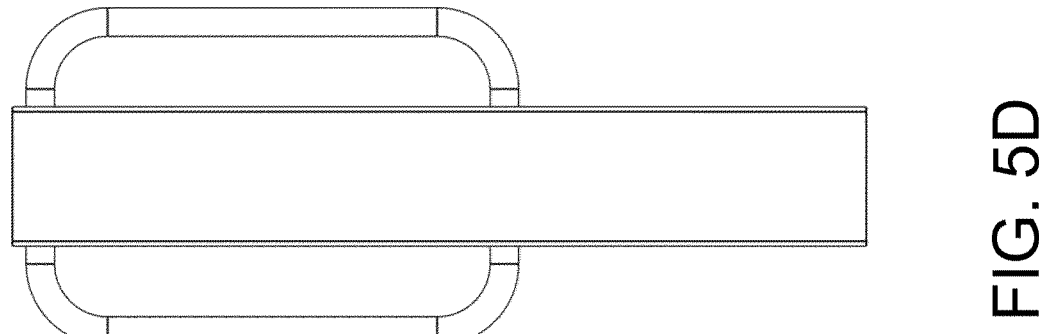
Figure 5C:
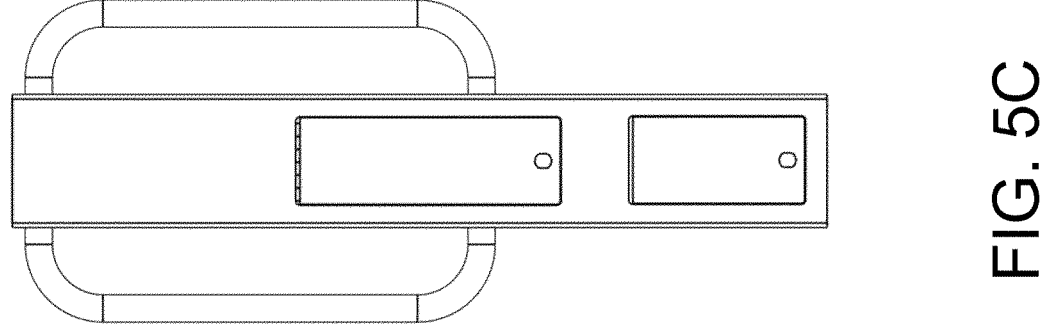
Figure 5F:
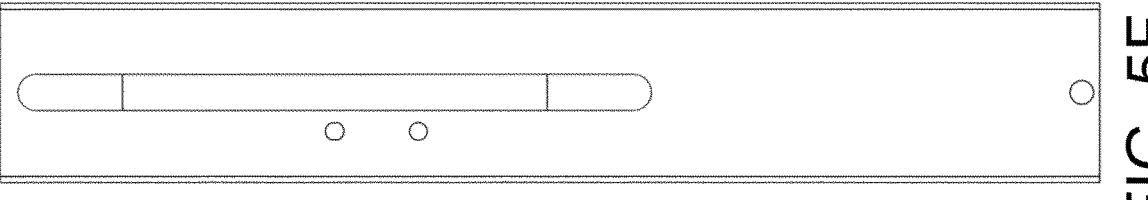
Figure 5E:
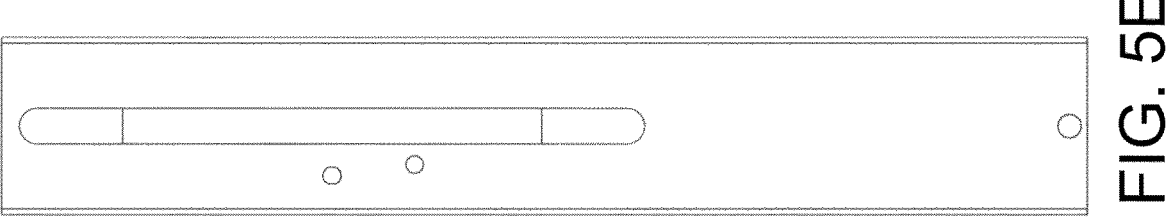
Figure 5G:
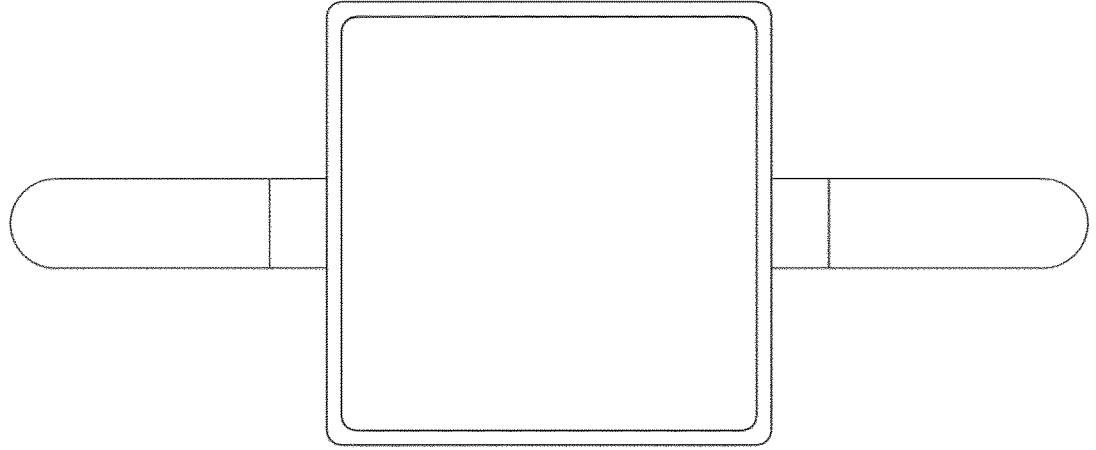
Figure 5H:
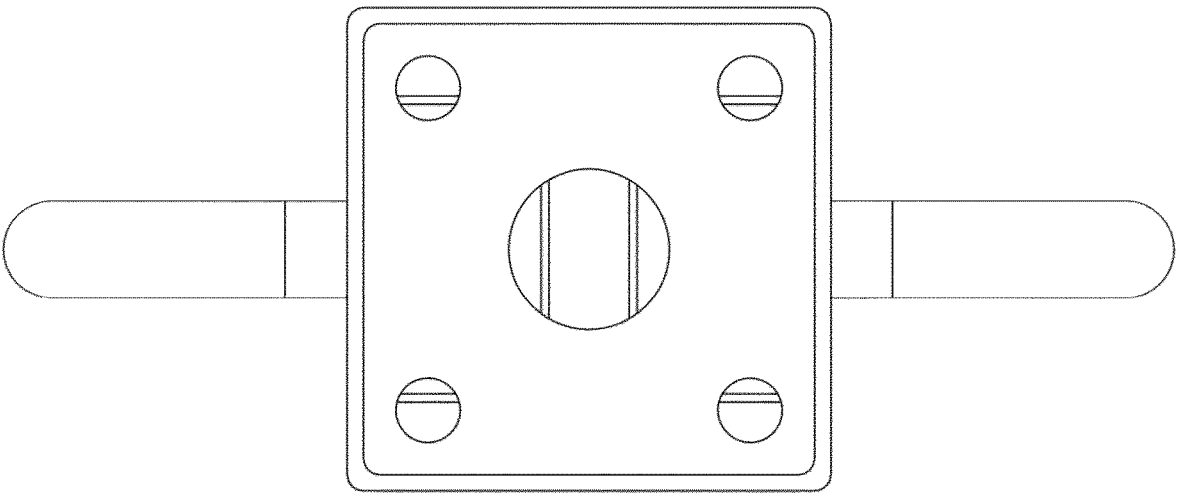
Figure 6A:
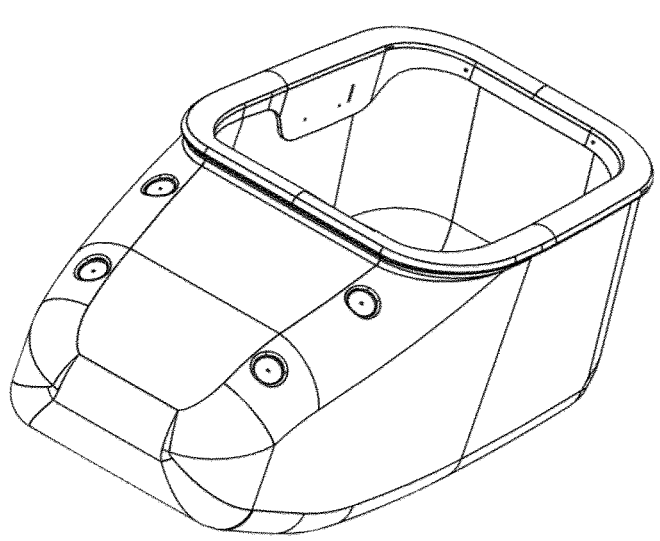
FIG. 6A, FIG. 6B, FIG. 6C, FIG. 6D, FIG. 6E, FIG. 6F, and FIG. 6G are schematic diagrams showing a front perspective view, a back perspective view, a side elevation view, a top plan view, and a bottom plan view, a front elevation view, and a back elevation view, respectively of the side car as described with reference to FIGS. 1A-1B.
Figure 6B:
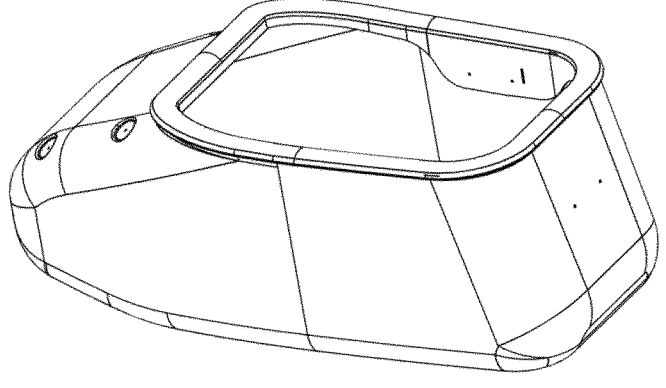
Figure 6C:
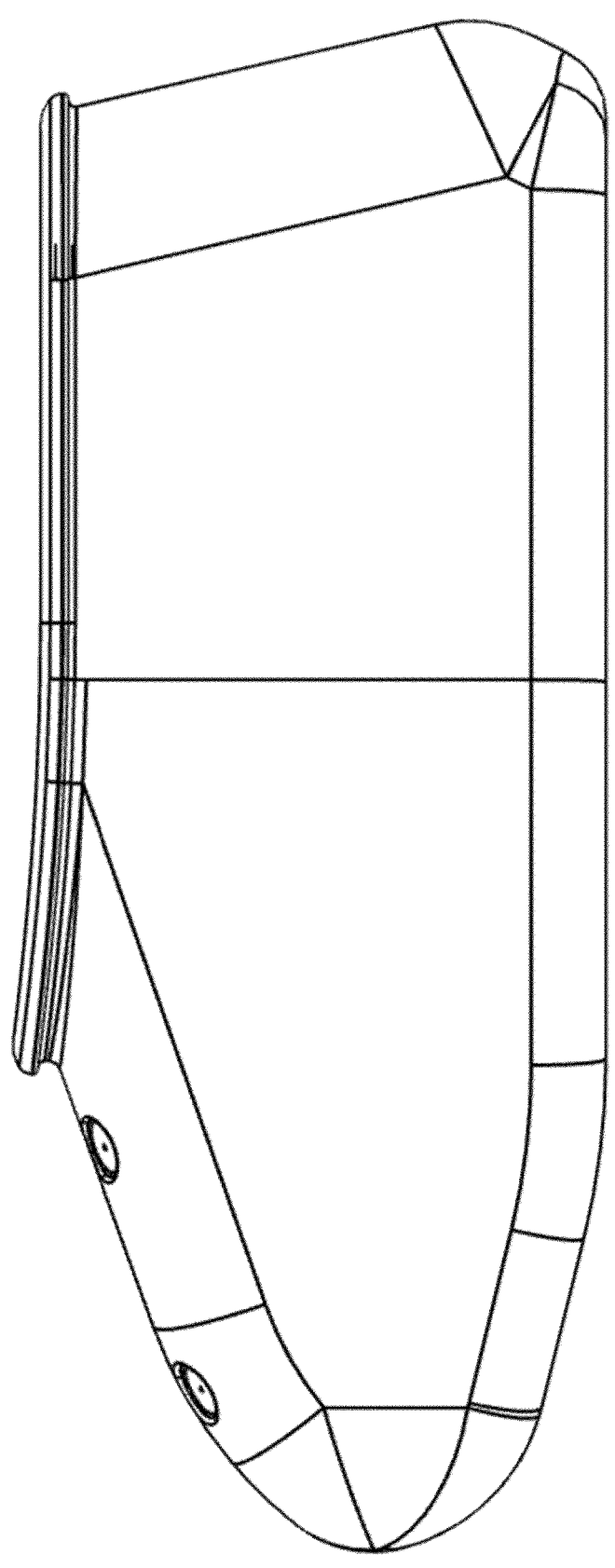
Figure 6E:
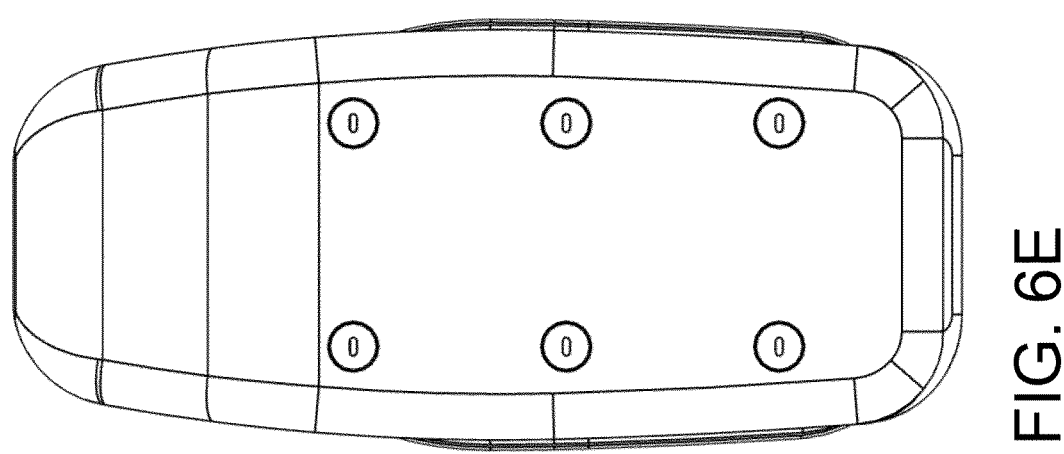
Figure 6D:
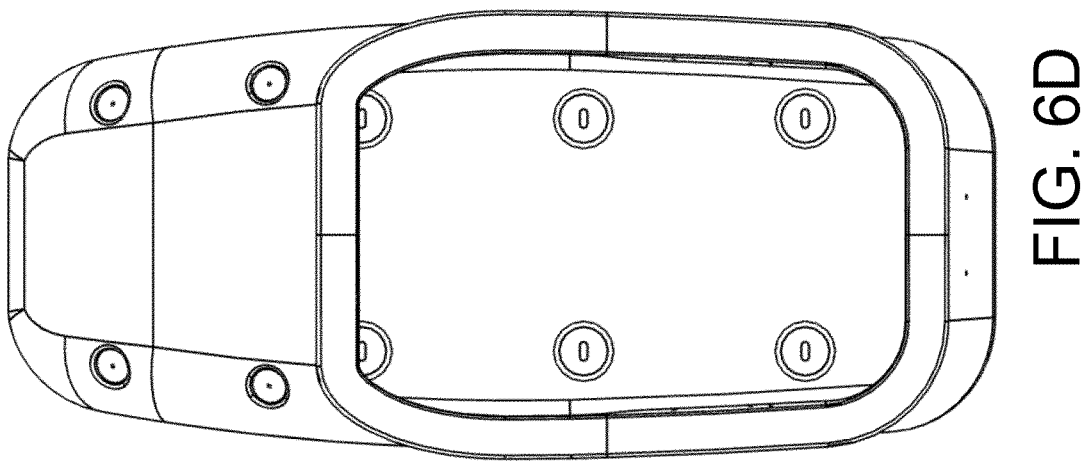
Figure 6F:
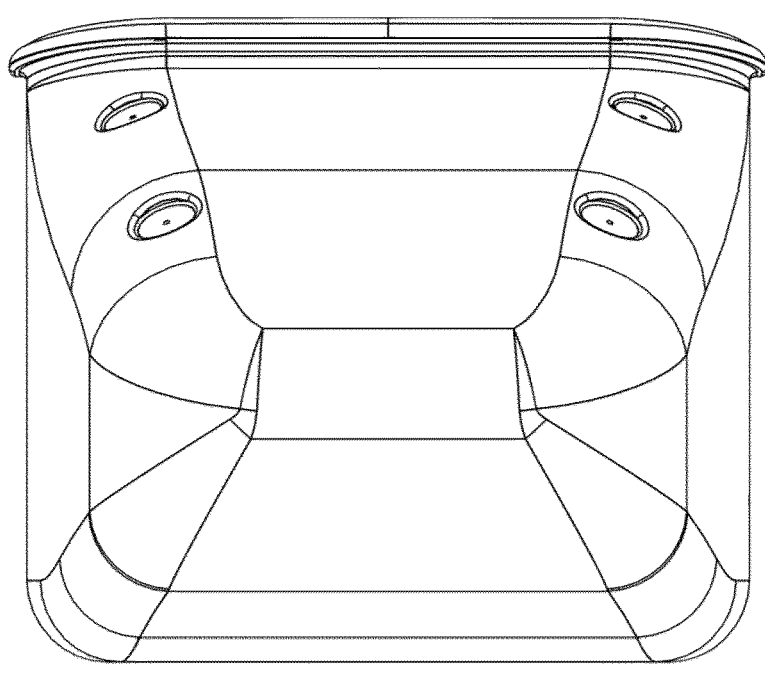
Figure 6G:
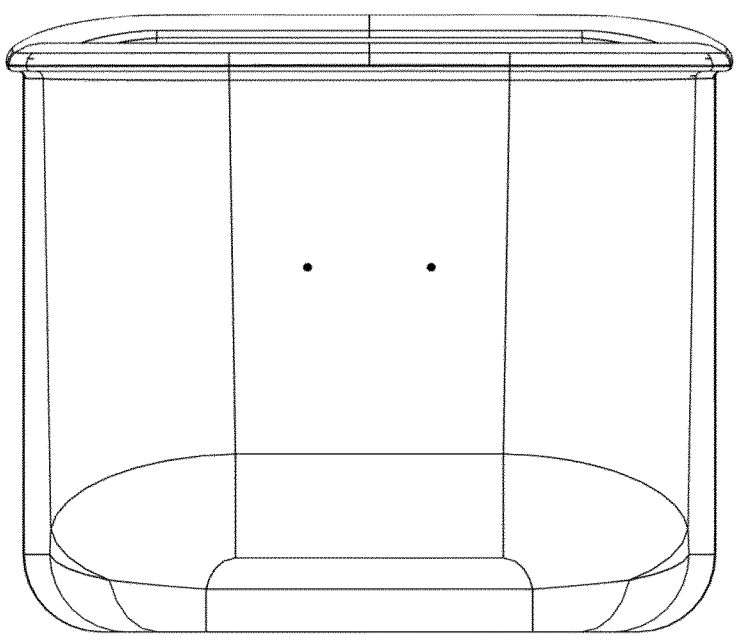

As shown in FIG. 4A, the EBDS 200 includes a cable outlet 405 between the door 215 and the charging pedestal 300. For example, the cable outlet 405 may allow a charging cable to be extended from the electric power source 305 in the securable storage compartment 210 to an input interface of an electric bicycle. As shown in FIG. 4G, the EBDS 200 includes mounting features 410 to securely fix the EBDS 200 to a base (e.g., ground, concrete floor).

FIG. 5A, FIG. 5B, FIG. 5C, FIG. 5D, FIG. 5E, FIG. 5F, FIG. 5G, and FIG. 5H are schematic diagrams showing a front perspective view, a back perspective view, a front elevation view, a back elevation view, a left side elevation view, a right side elevation view, a top plan view, and a bottom plan view, respectively of the second embodiments of the EBDS as described with reference to FIGS. 4A-4G.

FIG. 6A-6G are schematic diagrams showing a front perspective view, a back perspective view, a side elevation view, a top plan view, and a bottom plan view, a front elevation view, and a back elevation view, respectively of the side car as described with reference to FIGS. 1A-1B.

Figure 7A:
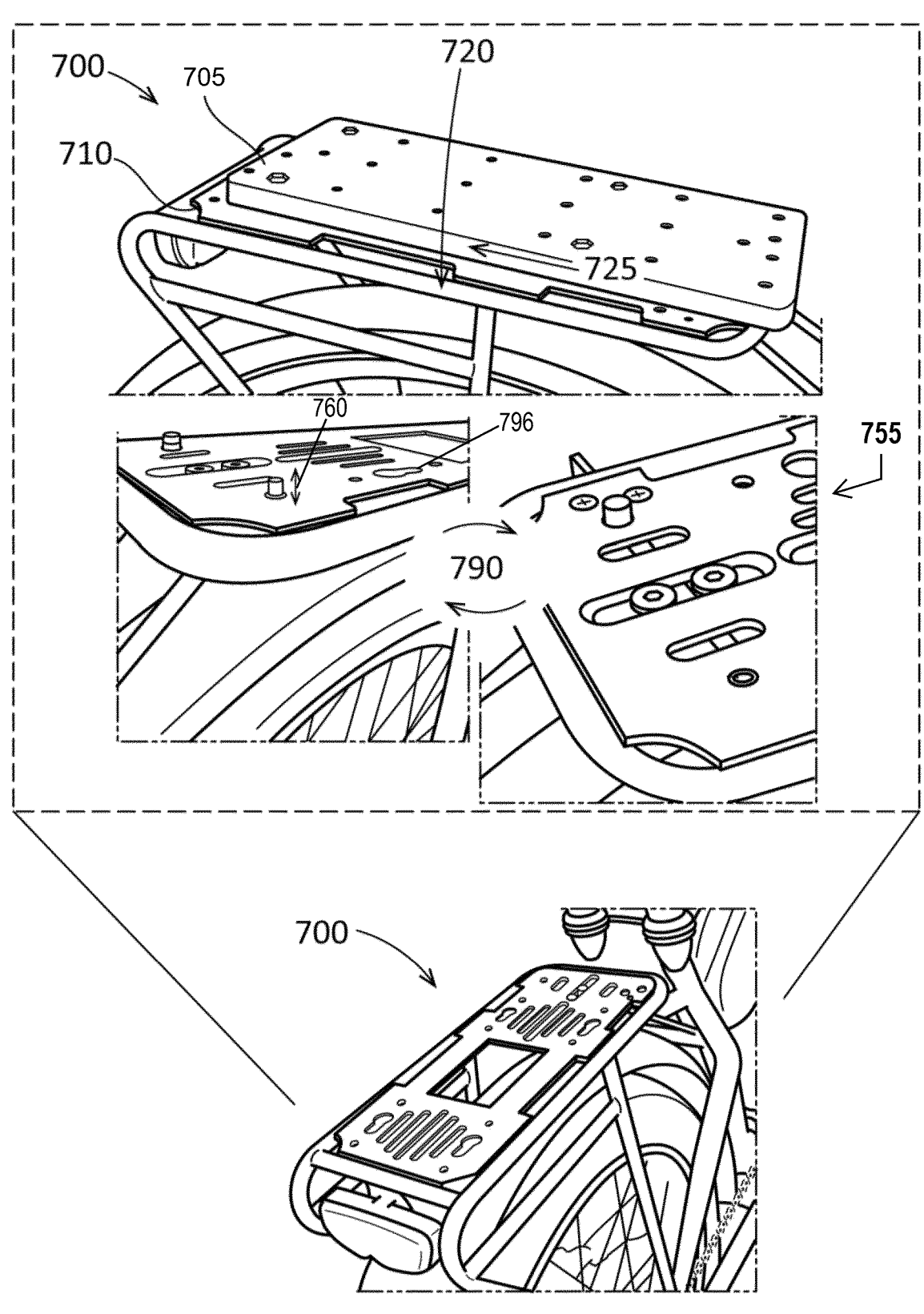
FIG. 7A depicts an exemplary accessory rack employed in an illustrative use-case scenario.
Figure 7B:
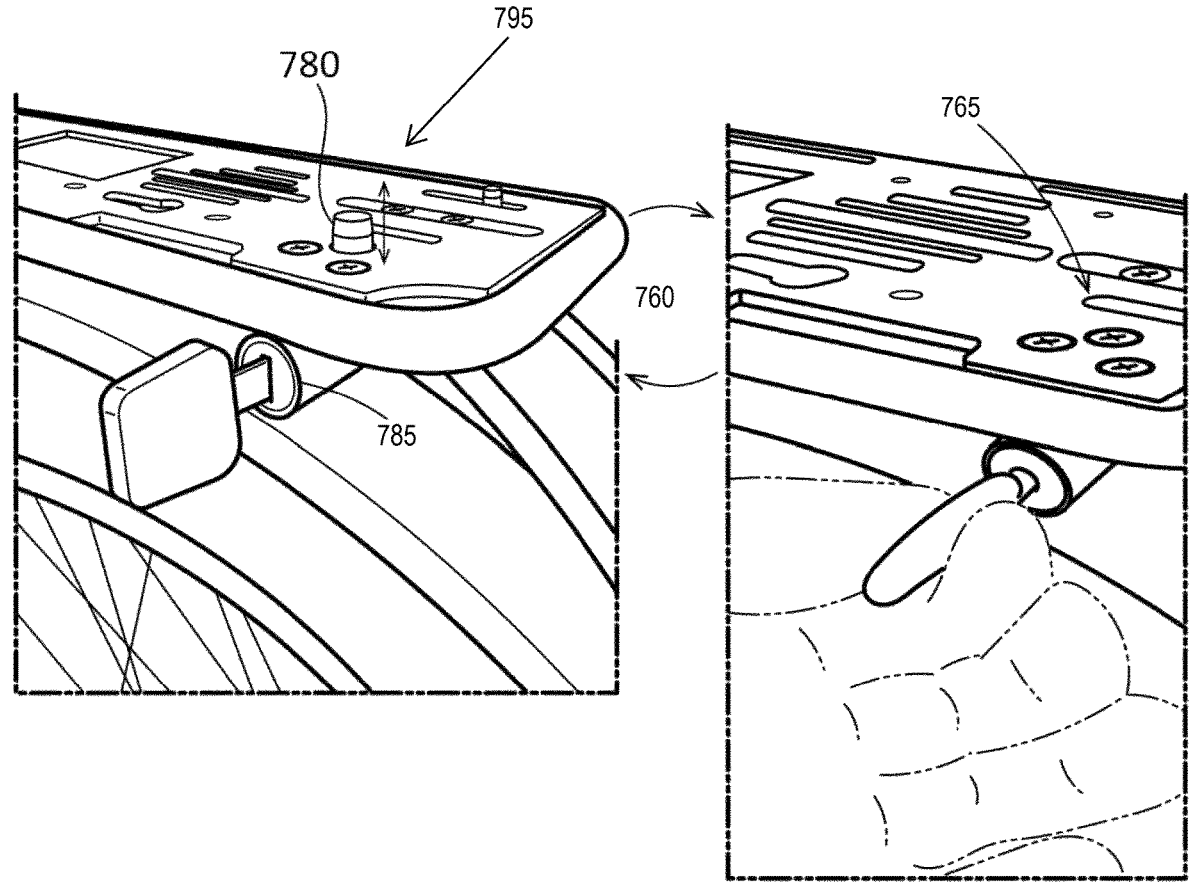
FIG. 7B depicts an exemplary accessory rack employed in an illustrative use-case scenario.
Figure 7B:
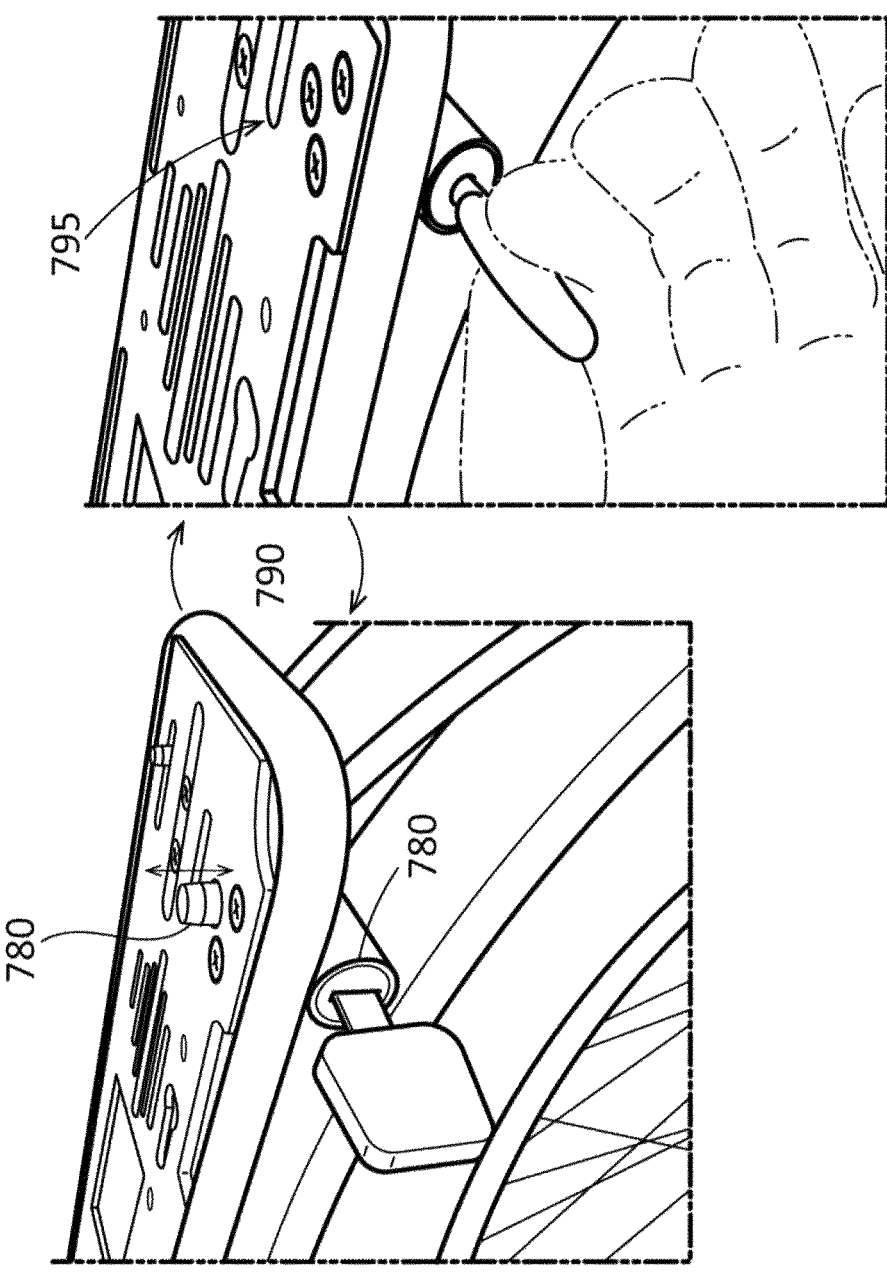

FIGS. 7A-7B depicts an exemplary quick couple base (QCB 700) coupled to an exemplary MPEB. For example, the QCB 700 may be (releasably, fixedly) coupled to the MPEB 100. In some implementations, for example, the QCB 700 may be coupled (e.g., releasably, fixedly) to a vehicle (e.g., a manual bicycle, a tricycle, a motorcycle, a non-electric powered bicycle, a boat). In some implementations, by way of example and not limitation, a mounting base may be coupled to non-vehicular objects. The QCB 700 may, for example be configured as a carrier to releasably couple interchangeable accessories to a vehicle. For example, a user may use the QCB 700 to easily couple accessories to the MPEB.

FIG. 7A-7B show an exemplary coupling mechanism of an exemplary QCB. As an illustrative example without limitation shown in FIGS. 7A-7B, a user may first lay a base module 705 (e.g., a base plate) towards a mounting plate 710 of the mounting tracks 810. For example, the base module 705 may include compatible studs at a bottom surface against the mounting plate 710 of the mounting tracks 810. As shown in FIG. 7A, the base module 705 may register downward towards a receiving end (e.g., an end with larger aperture) of the mounting tracks 810. After the base module 705 is registered with the mounting tracks 810, the user may push the base module 705 towards (as shown by an arrow 725) a securing end of the mounting tracks 810. At this time, the base module 705 may be securely mounted to a frame 720 of an electric bicycle through the QCB 800.

The base module 705 includes a registration pin. For example, the registration pin may register with the mounting tracks 796 of the QCB 800. For example, the registration pin may include mounting lugs to align with a narrow portion of the mounting tracks 796.

Various examples of embodiments of the accessories are described with reference to FIGS. 8A-10.

Figure 8A:
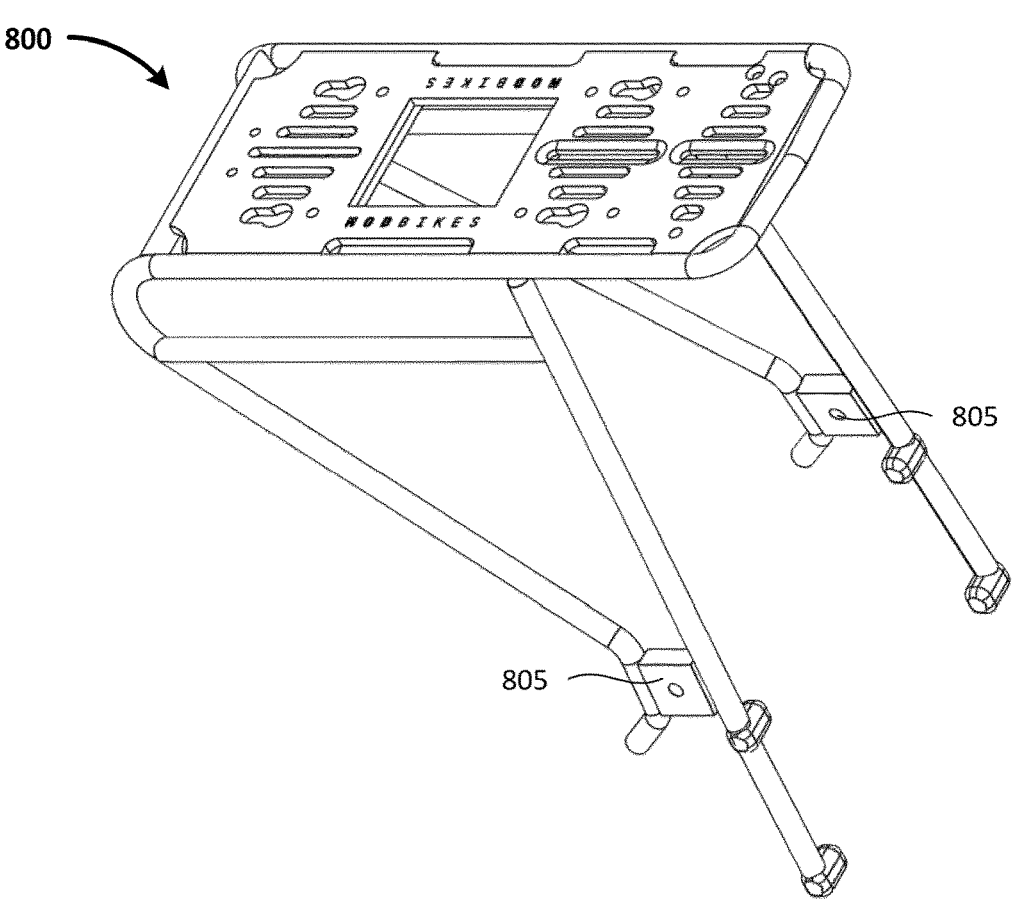
FIG. 8A depicts a schematic of an exemplary accessory rack.
Figure 8B:
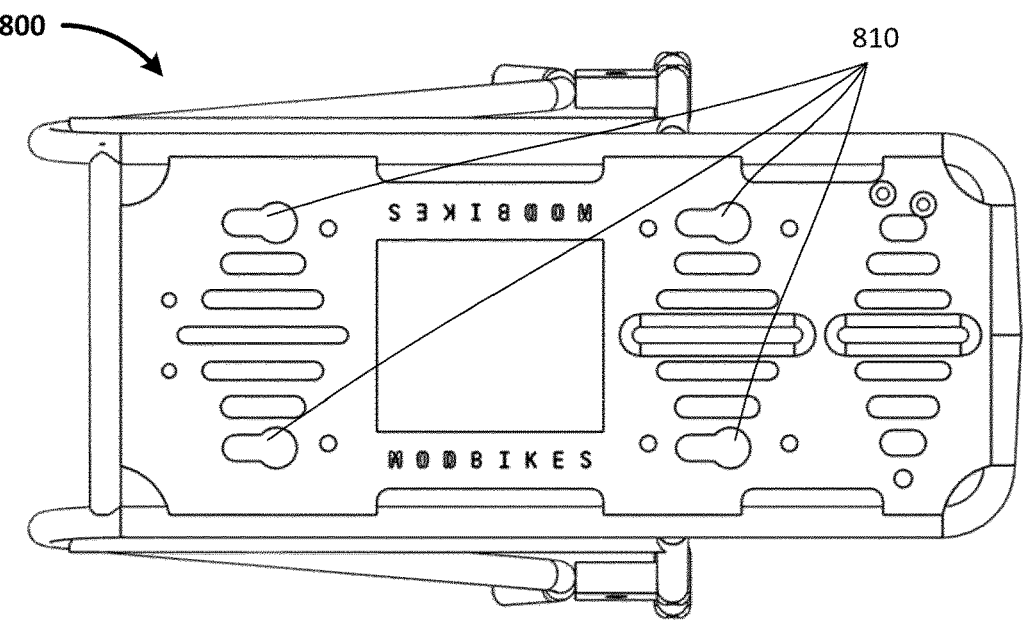
FIG. 8B depicts a schematic of an exemplary accessory rack.

FIG. 8A and FIG. 8B are schematic diagrams showing a perspective view and a top view of an exemplary QCB. As shown in FIG. 8A, a QCB 800 includes two coupling features 805 for attaching the QCB 800 to an electric bicycle (e.g., the MPEB 100). As shown in FIG. 8B, the QCB 800 includes multiple mounting tracks 810. For example, a user may use the mounting tracks 810 to couple rack and/or other accessories to the QCB 800.

In some implementations, the mounting tracks 810 may be less than a predetermined length (e.g., 2 cm, 3 cm, 5 cm). For example, the relatively short length of the mounting tracks 810 may advantageously allow quick snap on and/or quick release of any accessories on the QCB 800.

FIG. 8A depicts an exemplary biased locking mechanism of a QCB. In the depicted example, the base module 705 is provided with a biased locking member 780. The biased locking member 780 may, for example, releasably engage a corresponding feature in an accessory when the accessory is registered with the slots in the base and operated into a coupled mode with the base module 705. The biased locking member 805 may, for example, be urged by a biasing member (e.g., a spring, not shown) towards a locked mode 755. The locking member 805 may, for example, be operated 760 into an unlocked mode 765 (e.g., by a user pulling the locking member downward, by a user operating a release mechanism such as a lever and/or causing a powered actuator to operate). The locking member 805 may, for example, advantageously prevent accidental displacement of the accessory out of a coupling mode with the base module 1205.

FIG. 8B depicts an exemplary locking mechanism of a QCB. In the depicted example, the base module 705 is provided with a locking member 780. As depicted, the locking member 780 is selectively operable 790 between a locked mode 795 and an unlocked mode 765. In this example, a lock actuator 785 (e.g., a barrel lock) may be key operated (e.g., manually) to operate the locking member 780 between the locked mode 795 and the unlocked mode 765. In the locked mode, the locking member 780 may, for example, releasably engage a corresponding feature in an accessory when the accessory is registered with the slots in the base and operated into a coupled mode with the base module 705.

In some implementations, by way of example and not limitation, a locking member (e.g., a biased locking member) may be provided in an accessory. The locking member in the accessory may, for example, be configured to engage a corresponding feature (e.g., cavity, aperture) in the base module 705.

In some embodiments, a QCB may, for example, include a quick release handle (not shown). Once the quick release handle is pulled, for example, the base module 705 may be unsecured to be removed.

Figure 9A:
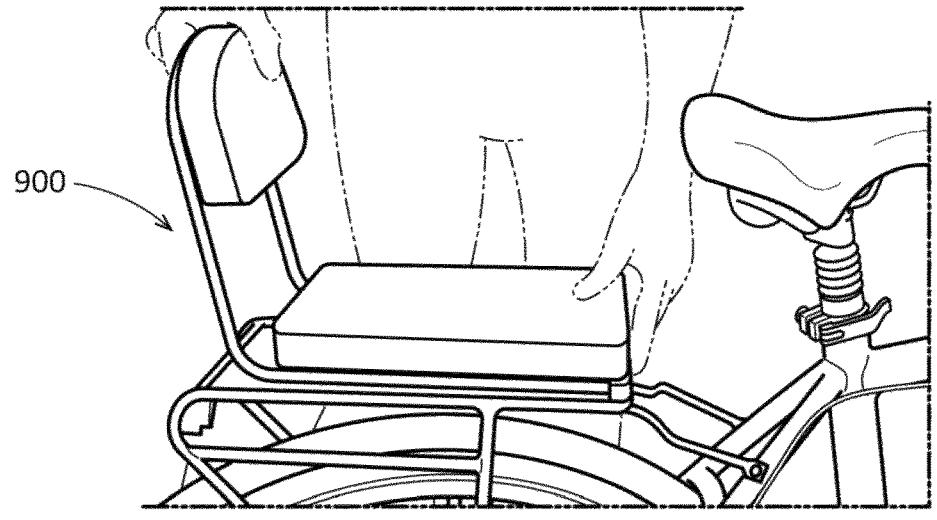
FIG. 9A depicts an exemplary accessory rack including a seat accessory.

FIG. 9A shows an exemplary 'releasably coupled' (e.g., releasably coupled) seat configured to couple to an exemplary MPEB using an exemplary QCB. As shown, an additional seat 900 may be attached to an electric bicycle (e.g., the MPEB) using the mechanism as described with reference to FIGS. 7A-8B.

Figure 9B:
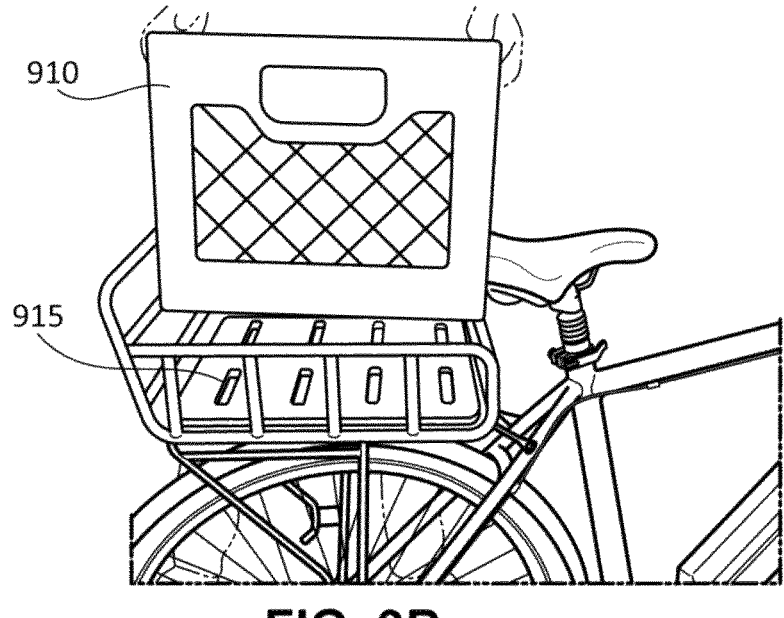
FIG. 9B depicts an exemplary accessory rack including a cargo carrying accessory.

FIG. 9B shows an exemplary releasably coupled rack configured to couple to an exemplary MPEB using an exemplary QCB. As shown, a releasably coupled rack 915 may be attached to an electric bicycle (e.g., the MPEB) using the mechanism as described with reference to FIGS. 7A-8B. For example, the releasably coupled rack 915 may advantageously be used to hold a milk basket 910.

Figure 10:
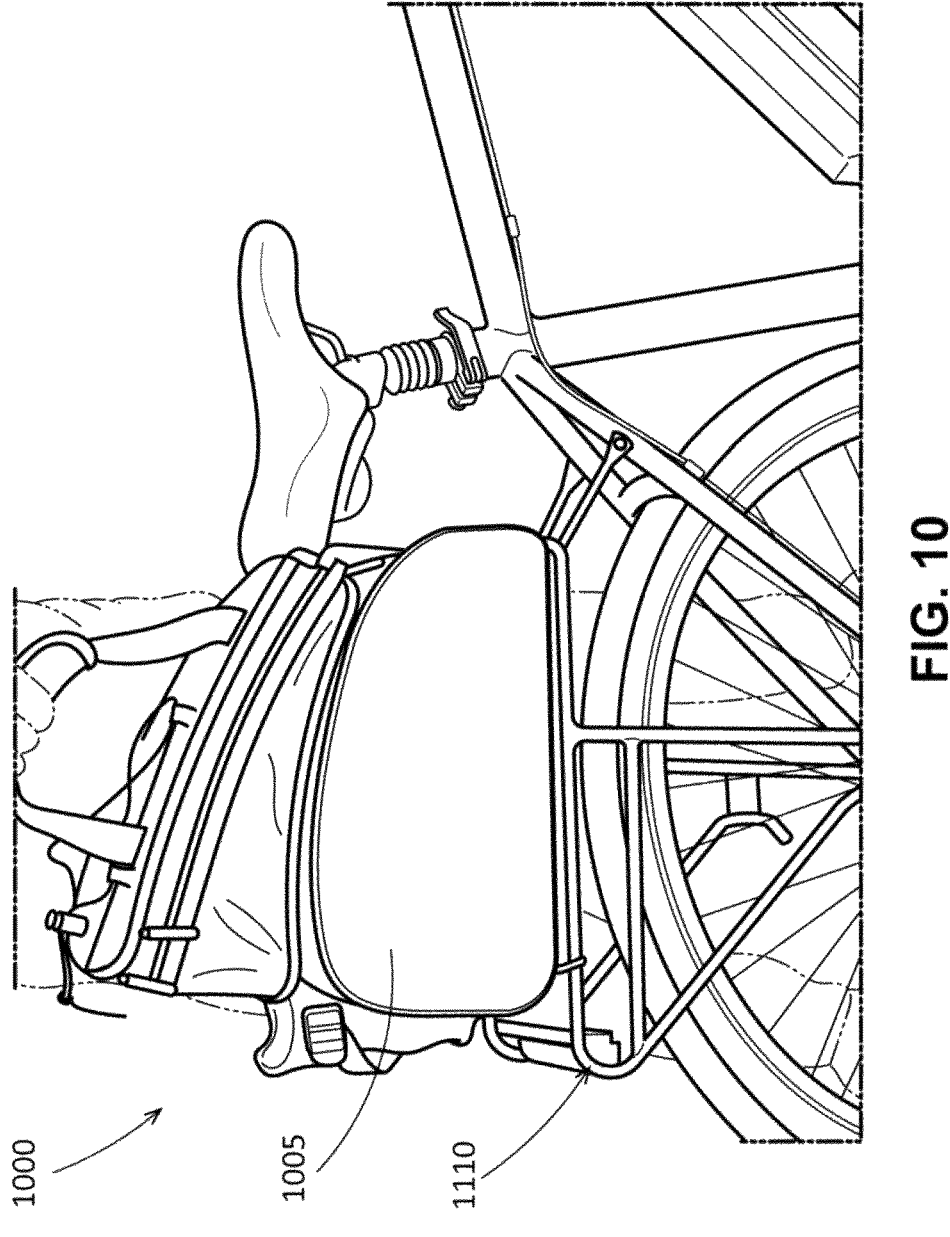
FIG. 10 depicts an exemplary accessory rack including a bag carrying accessory.
Figure 11:
FIG. 11, FIG. 12, FIG. 13, FIG. 14, FIG. 15, FIG. 16, FIG. 17, FIG. 18, FIG. 19, FIG. 20, FIG. 21 and FIG. 22 depict an illustrative bicycle and sidecar.
Figure 12:
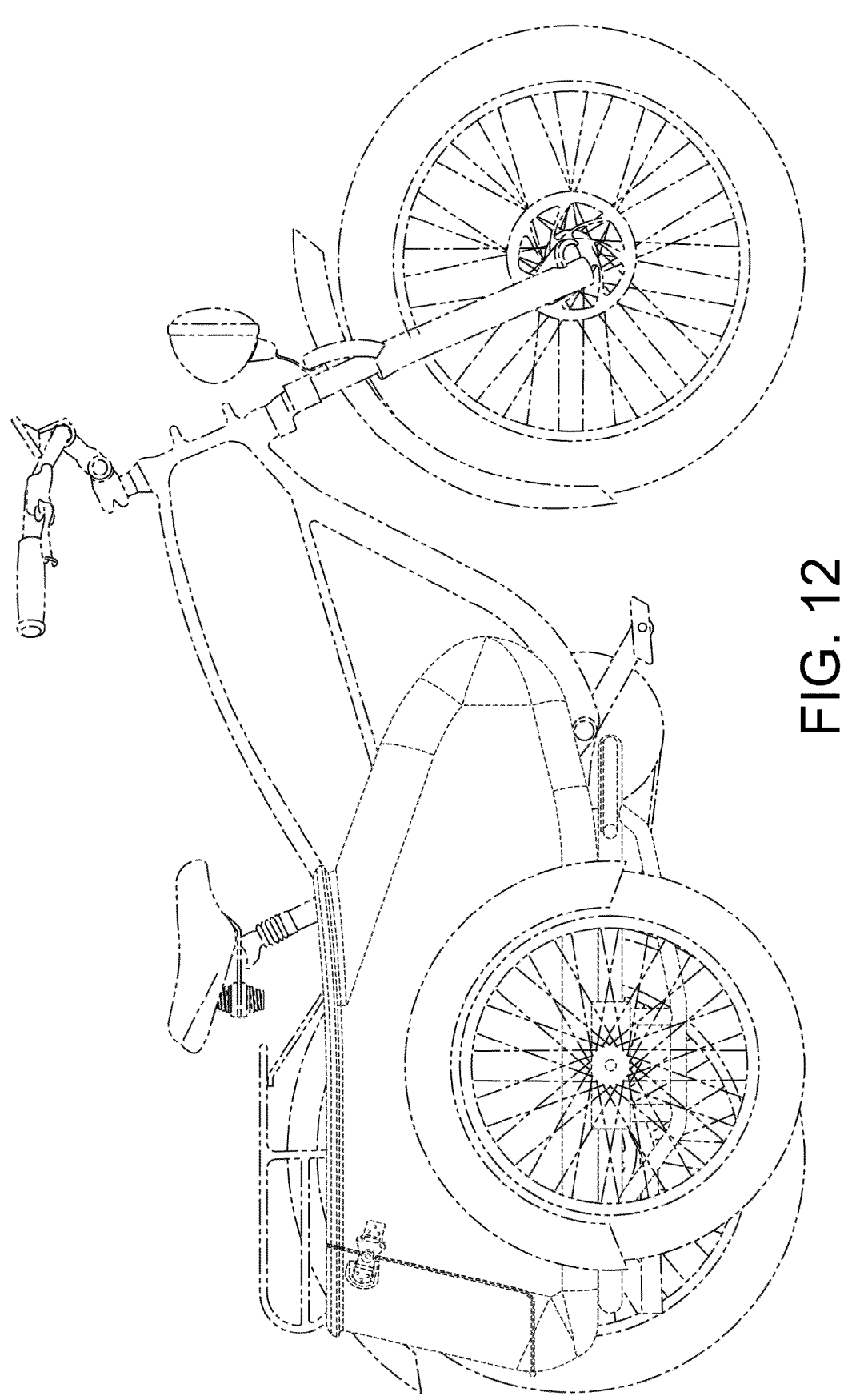
Figure 13:
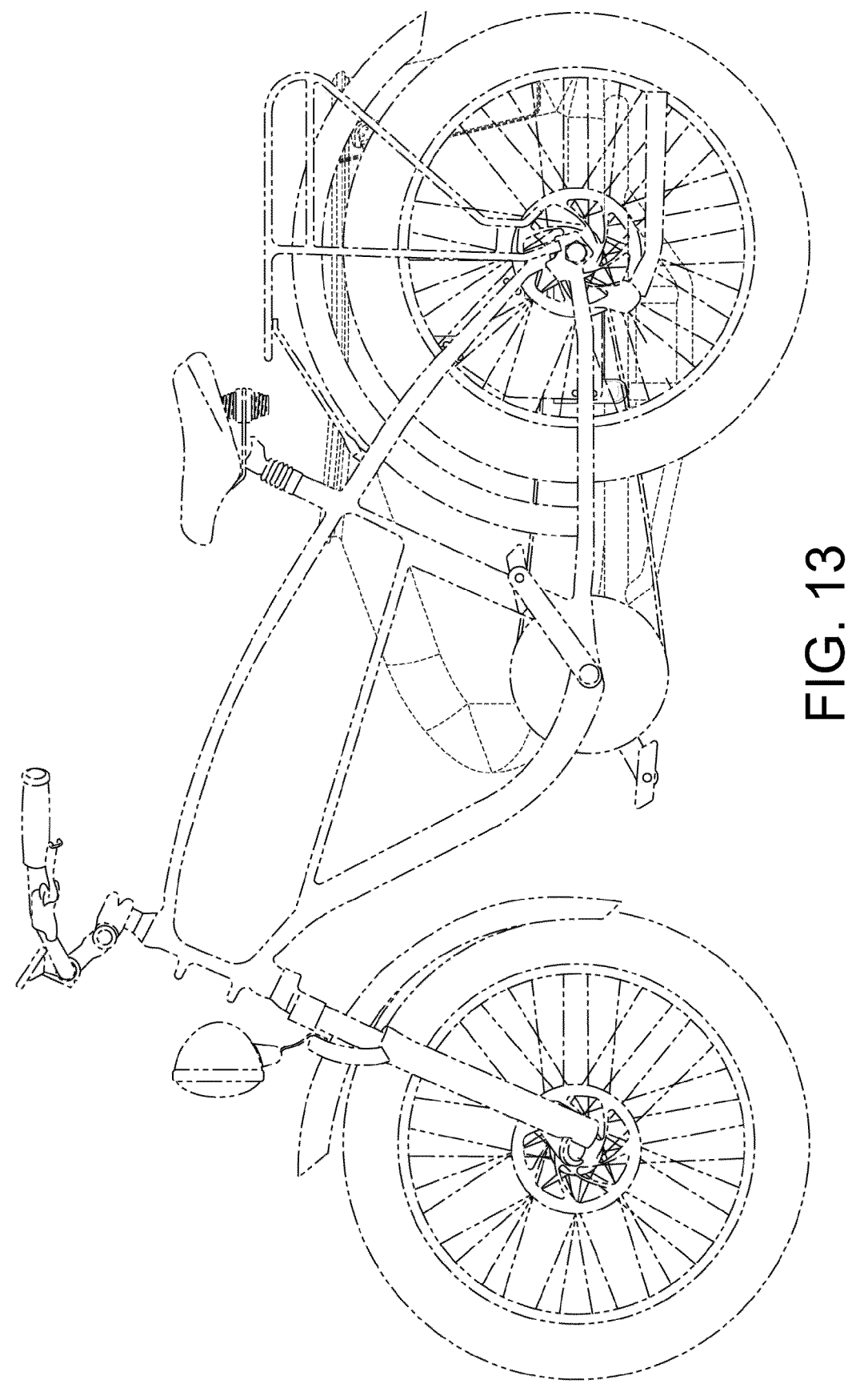
Figure 14:
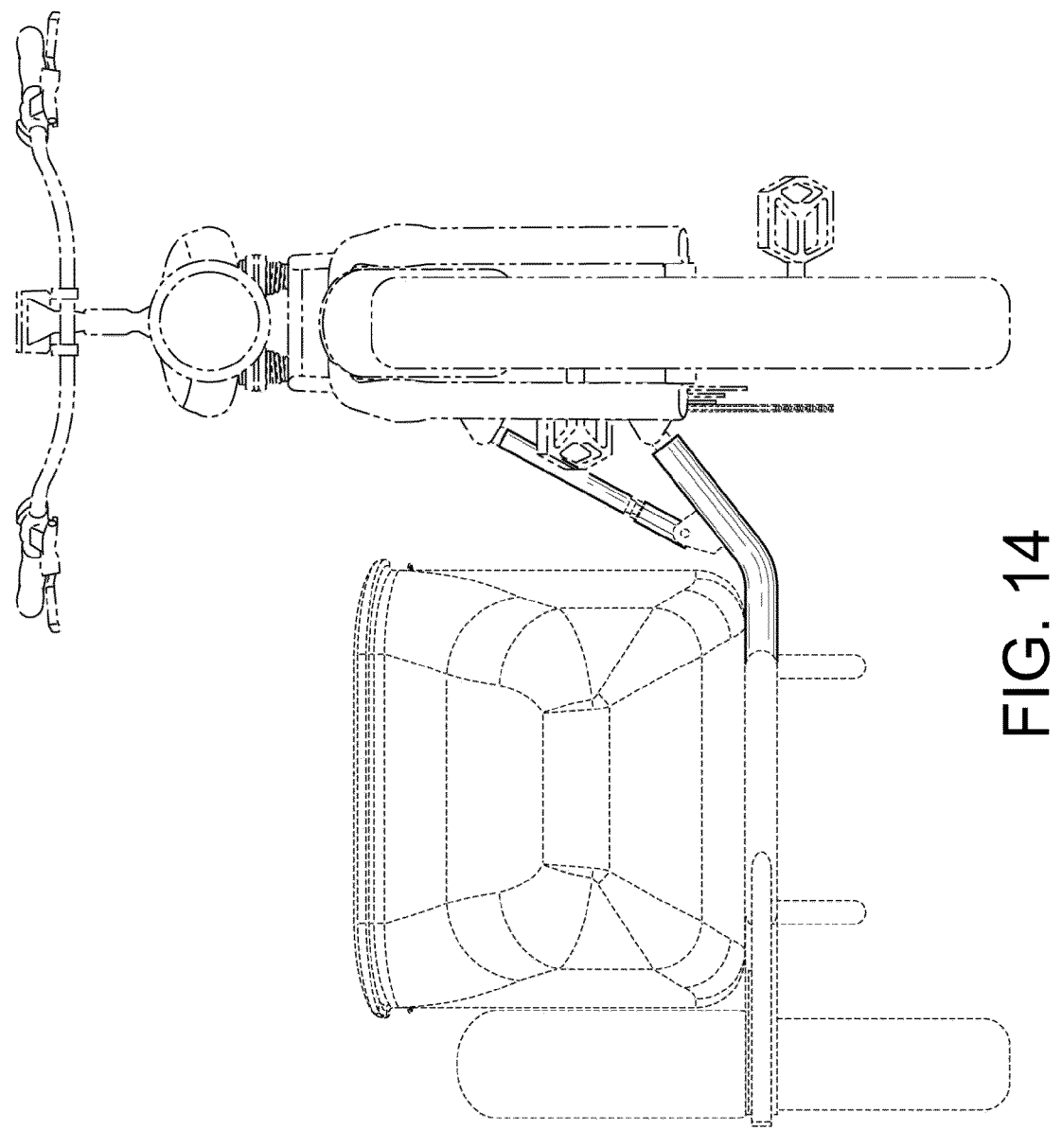
Figure 15:
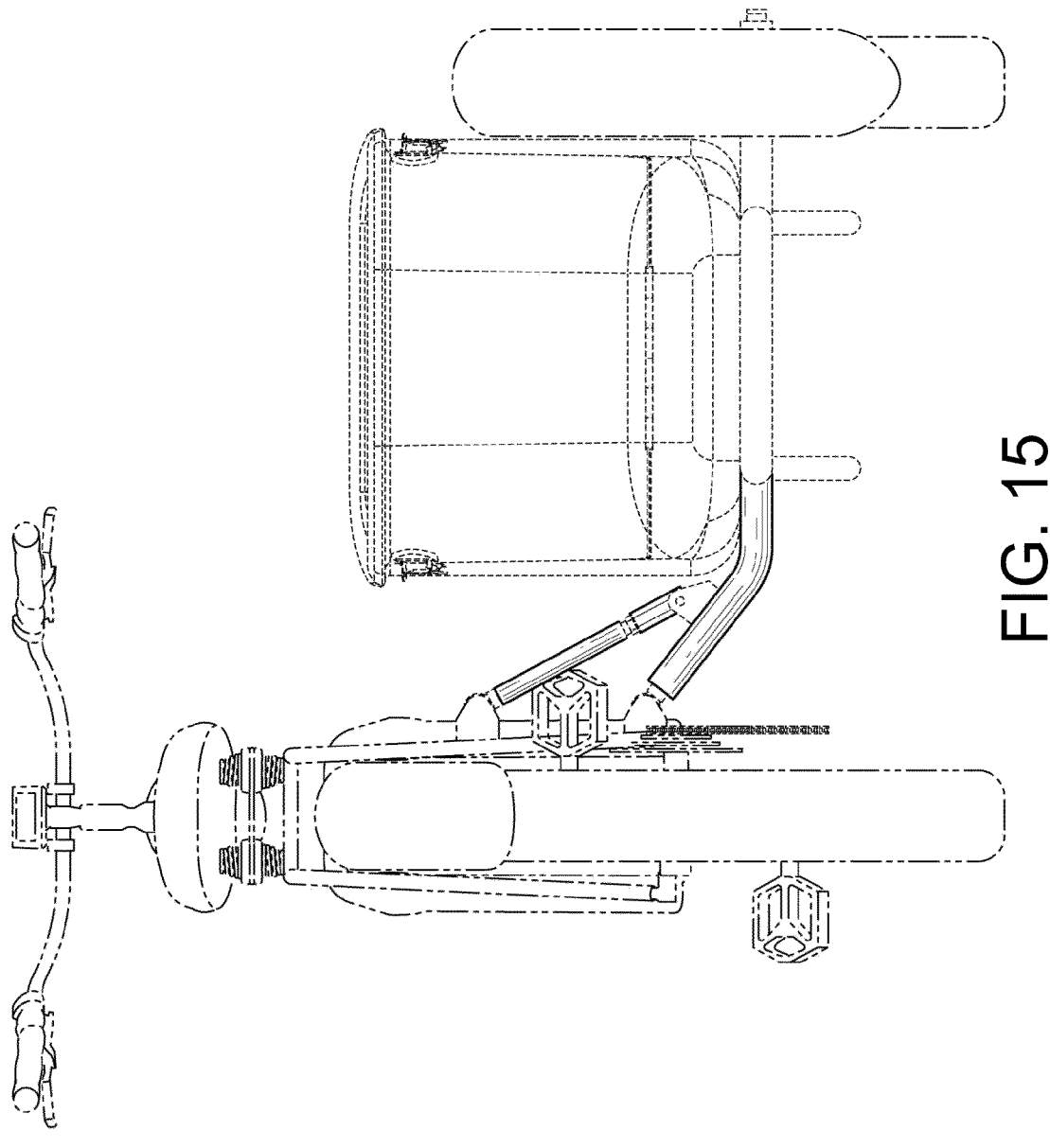
Figure 16:
Figure 17:
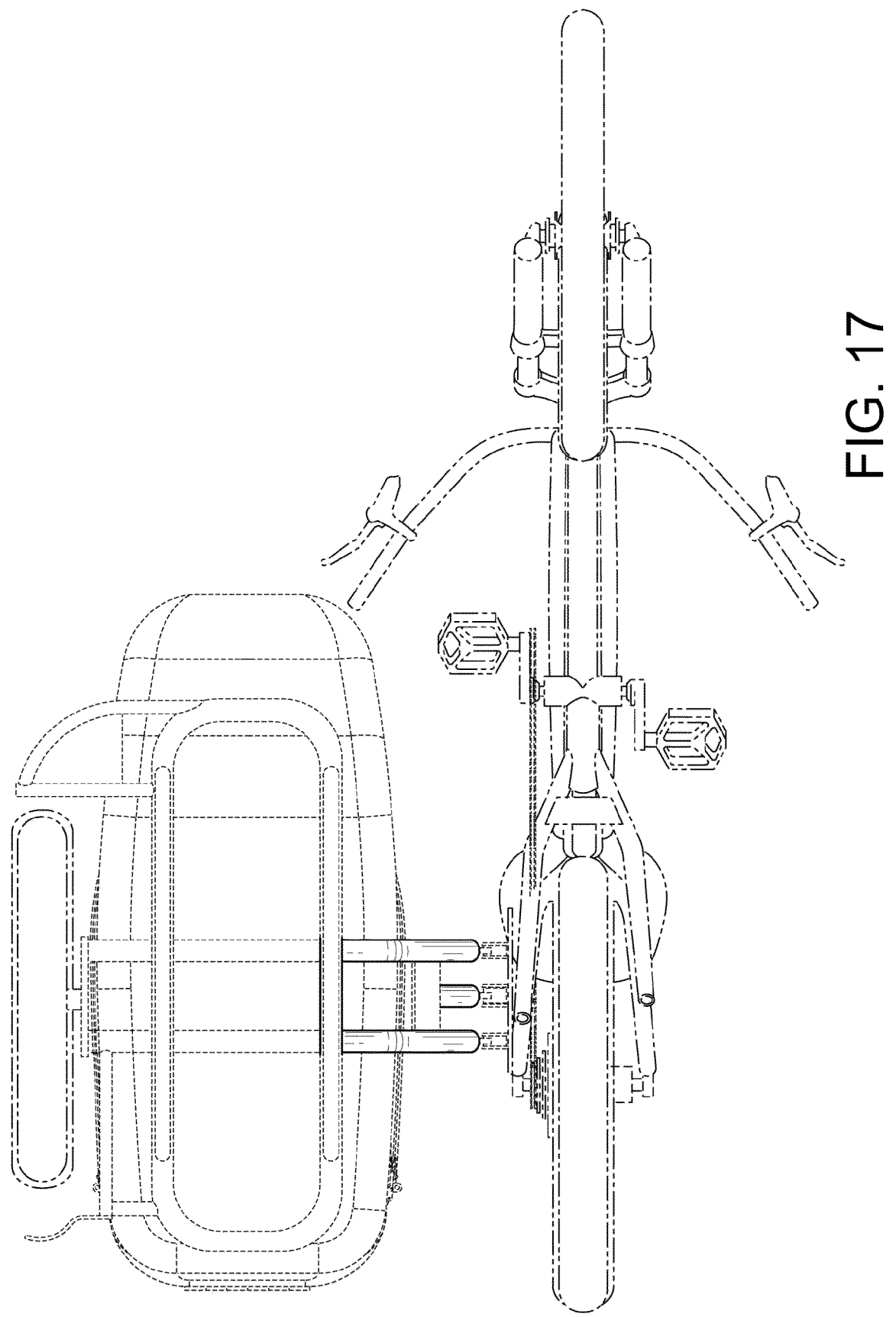

FIG. 10 shows an exemplary scenario 1000 including releasably coupled trunk bag 1005 configured to couple to an exemplary MPEB using an exemplary QCB. As shown, a trunk bag 1005 may include coupling studs compatible to the mounting tracks 810. For example, the trunk bag 1005 may be attached to an electric bicycle (e.g., the MPEB) using the mechanism as described with reference to FIGS. 8A-8B.

In some implementations, by way of example and not limitation, a locking member may operate along a longitudinal axis of the base member. In some implementations, a locking member may, for example, operate along a lateral axis of the base member. In some implementations, a locking member may operate along a curvilinear path (e.g., a rotating hook, a cam).

In some implementations, by way of example and not limitation, an accessory may be provided with one or more locating and/or mounting members (e.g., pins, lugs). The members may, for example, extend away from the accessory along a longitudinal axis. At a distal end of the members, the members may have an engagement feature (e.g., having a larger dimension at the distal end than an immediate proximal regional in at least one cross-sectional dimension orthogonal to the longitudinal axis) The mounting members may, for example, be brought into alignment with a narrow portion of the mounting tracks 810 (e.g., configured as a 'key' such as shown at least with respect to FIGS. 8A-8B). Once the mounting pins are registered with the mounting tracks 810, and operated until the proximal region of the mounting members are within the narrow region of the mounting tracks, the distal region of the mounting members engages the mounting track to prevent removal of the accessory from the base (a coupled mode). A rigid registration pin is operated (e.g., automatically, manually) into a locked mode to prevent the accessory from sliding out of the coupled mode.

In some implementations, mounting members may, for example, extend from the base and engage corresponding mounting tracks on an accessory. For example, a separate mounting module may be coupled to an accessory (e.g., a plate with lugs, a plate with mounting tracks). In some implementations, by way of example and not limitation, mounting members and/or corresponding mounting tracks may be provided on one or both of the accessory, the vehicle, or both.

In some implementations, for example, an accessory may include an extra seat. For example, the seat may include a baby carriage and/or a baby seat.

FIG. 11, FIG. 12, FIG. 13, FIG. 14, FIG. 15, FIG. 16, FIG. 17, FIG. 18, FIG. 19, FIG. 20, FIG. 21 and FIG. 22 depict a perspective detail view, a right side assembly view, a left side assembly view, a front assembly view, a rear assembly view, a top assembly view, a bottom assembly view, a perspective detail view, a right detail view, a left detail view, a top detail view, and a bottom detail view, respectively. As depicted, the illustrative sidecar includes a door 1105. The door 1105 may, for example, be operated to access the interior of the sidecar. In the depicted example, the door 1105 is hingedly coupled to the sidecar body by hinge 1110, and releasably fastened in a closed mode by latches 1115. This enclosure encompasses any and/or all dashed lines of FIGS. 11-22 being solid lines. In some embodiments, the door may be hingedly coupled on a side, for example. In some implementations, the door may have multiple doors (e.g., bi-fold door, double door).

Some embodiments may, for example, include doors in other locations (e.g., side, front, bottom, top). Some embodiments may, for example, include coupling mechanisms in addition to or other than latches and/or hinges (e.g., sliding track(s), deadbolt, magnet, hook-and-loop fabric).

Although various embodiments have been described with reference to the figures, other embodiments are possible.

Although an exemplary system has been described with reference to FIGS. 1A-C, other implementations may be deployed in other industrial, scientific, medical, commercial, and/or residential applications.

In various embodiments, some bypass circuits implementations may be controlled in response to signals from analog or digital components, which may be discrete, integrated, or a combination of each. Some embodiments may include programmed, programmable devices, or some combination thereof (e.g., PLAs, PLDs, ASICs, microcontroller, microprocessor), and may include one or more data stores (e.g., cell, register, block, page) that provide single or multi-level digital data storage capability, and which may be volatile, non-volatile, or some combination thereof. Some control functions may be implemented in hardware, software, firmware, or a combination of any of them.

Computer program products may contain a set of instructions that, when executed by a processor device, cause the processor to perform prescribed functions. These functions may be performed in conjunction with controlled devices in operable communication with the processor. Computer program products, which may include software, may be stored in a data store tangibly embedded on a storage medium.

Although an example of a system, which may be portable, has been described with reference to the above figures, other implementations may be deployed in other processing applications, such as desktop and networked environments.

Temporary auxiliary energy inputs may be received, for example, from chargeable or single use batteries, which may enable use in portable or remote applications. Some embodiments may operate with other DC voltage sources, such as batteries, for example. Alternating current (AC) inputs, which may be provided, for example from a 50/60 Hz power port, or from a portable electric generator, may be received via a rectifier and appropriate scaling. Provision for AC (e.g., sine wave, square wave, triangular wave) inputs may include a line frequency transformer to provide voltage step-up, voltage step-down, and/or isolation.

Some systems may be implemented as a computer system that can be used with various implementations. For example, various implementations may include digital circuitry, analog circuitry, computer hardware, firmware, software, or combinations thereof. Apparatus can be implemented in a computer program product tangibly embodied in an information carrier, e.g., in a machine-readable storage device, for execution by a programmable processor; and methods can be performed by a programmable processor executing a program of instructions to perform functions of various embodiments by operating on input data and generating an output. Various embodiments can be implemented advantageously in one or more computer programs that are executable on a programmable system including at least one programmable processor coupled to receive data and instructions from, and to transmit data and instructions to, a data storage system, at least one input device, and/or at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

In some implementations, one or more user-interface features may be custom configured to perform specific functions. Various embodiments may be implemented in a computer system that includes a graphical user interface and/or an Internet browser. To provide for interaction with a user, some implementations may be implemented on a computer having a display device. The display device may, for example, include an LED (light-emitting diode) display. In some implementations, a display device may, for example, include a CRT (cathode ray tube). In some implementations, a display device may include, for example, an LCD (liquid crystal display). A display device (e.g., monitor) may, for example, be used for displaying information to the user. Some implementations may, for example, include a keyboard and/or pointing device (e.g., mouse, trackpad, trackball, joystick), such as by which the user can provide input to the computer.

In various implementations, the system may communicate using suitable communication methods, equipment, and techniques. For example, the system may communicate with compatible devices (e.g., devices capable of transferring data to and/or from the system) using point-to-point communication in which a message is transported directly from the source to the receiver over a dedicated physical link (e.g., fiber optic link, point-to-point wiring, daisy-chain). The components of the system may exchange information by any form or medium of analog or digital data communication, including packet-based messages on a communication network. Examples of communication networks include, e.g., a LAN (local area network), a WAN (wide area network), MAN (metropolitan area network), wireless and/or optical networks, the computers and networks forming the Internet, or some combination thereof. Other implementations may transport messages by broadcasting to all or substantially all devices that are coupled together by a communication network, for example, by using omni-directional radio frequency (RF) signals. Still other implementations may transport messages characterized by high directivity, such as RF signals transmitted using directional (i.e., narrow beam) antennas or infrared signals that may optionally be used with focusing optics. Still other implementations are possible using appropriate interfaces and protocols such as, by way of example and not intended to be limiting, USB 2.0, Firewire, ATA/IDE, RS-232, RS-422, RS-485, 802.11 a/b/g, Wi-Fi, Ethernet, IrDA, FDDI (fiber distributed data interface), token-ring networks, multiplexing techniques based on frequency, time, or code division, or some combination thereof. Some implementations may optionally incorporate features such as error checking and correction (ECC) for data integrity, or security measures, such as encryption (e.g., WEP) and password protection.

In various embodiments, the computer system may include Internet of Things (IoT) devices. IoT devices may include objects embedded with electronics, software, sensors, actuators, and network connectivity which enable these objects to collect and exchange data. IoT devices may be in-use with wired or wireless devices by sending data through an interface to another device. IoT devices may collect useful data and then autonomously flow the data between other devices.

Various examples of modules may be implemented using circuitry, including various electronic hardware. By way of example and not limitation, the hardware may include transistors, resistors, capacitors, switches, integrated circuits, other modules, or some combination thereof. In various examples, the modules may include analog logic, digital logic, discrete components, traces and/or memory circuits fabricated on a silicon substrate including various integrated circuits (e.g., FPGAs, ASICs), or some combination thereof. In some embodiments, the module(s) may involve execution of preprogrammed instructions, software executed by a processor, or some combination thereof. For example, various modules may involve both hardware and software.

In an illustrative aspect, a sidecar may include a wheel with an axis of rotation along an axis adjacent to and between a front wheel axis of rotation of a vehicle and an rear wheel axis of rotation of the vehicle. The axis of rotation of the wheel may, for example, be centered below a center of a rear wheel axis of rotation of the vehicle. The sidecar may, for example, include a sidecar frame that is coupled to a vehicle frame by at least three arms. At least one of the at least three arms may, for example, terminate in a rotatable socket. At least one of the at least three arms may, for example, be adjustable in length. At least two of the at least three arms may, for example, be lower arms positioned lower than at least one of the remaining at least three arms.

The at least two lower arms may, for example, extend from the side car frame along a first axis for a first distance, and then along a second axis, intersecting the first axis, for a second distance, such that, for the second distance, the lower arms angle upward toward a mounting point on the vehicle.

The vehicle may, for example, further include an accessory mounting rack configured to be coupled to a frame of a cycling vehicle. The accessory mounting rack may include, for example: a multi-modal rack defining a flat surface, and a mounting plate comprising a plurality of keyhole apertures all aligned to operably engage in a single direction. The multi-modal rack may, for example, be configured into: a cargo mode to receive a load; and, an accessory mode having an auto-locking protrusion configured such that, when a corresponding multiple mounting studs of a mountable accessory is brought into register with and inserted through entry points of the multiple keyhole apertures, the studs are operated in a single direction for a distance where at least one keyhole slot is shorter than a length of the rack, then the auto-locking protrusion registers with and is urged into locking engagement with a corresponding locking feature on the mounting plate.

The accessory mounting rack may, for example, include a second locking protrusion configured such that, when the auto-locking protrusion is engaged with the corresponding locking feature on the mounting plate, then the second locking protrusion is selectively key-operable into a locked mode in which the second locking protrusion engages a corresponding second locking feature of the mounting plate such that the accessory mounting rack is prevented from being operated in a direction opposite the single direction.

The side car may, for example, be releasably coupled to the vehicle frame.

The vehicle may, for example, be an electric motor vehicle.

The vehicle may, for example, be configured to be received into a charging station.

The charging station may, for example, include: a pedestal defining a stowage cavity; a power outlet disposed in the stowage cavity; a door hingedly coupled to the pedestal and configured to selectively close up the stowage cavity; and a locking mechanism. The locking mechanism may, for example, include: a first protrusion extending from the pedestal in a first plane and defining a first aperture; a second protrusion extending from the stowage cavity in a second plane and defining a second aperture, wherein, when the door is closing the stowage cavity, the first aperture and the second aperture are aligned and the first plane is parallel to the second plane; and a third protrusion hingedly coupled to the pedestal along a different axis of rotation then the door defining a third aperture is configured such that, when the door is closing the stowage cavity, the first protrusion, and the second protrusion project through the third aperture substantially against opposite sides of the third aperture such that, when an lock is passed through the first and second aperture, the third protrusion is prevented from being hingedly operated sufficiently to permit hinged operation of the door sufficient to open the cavity.

Figure 18:
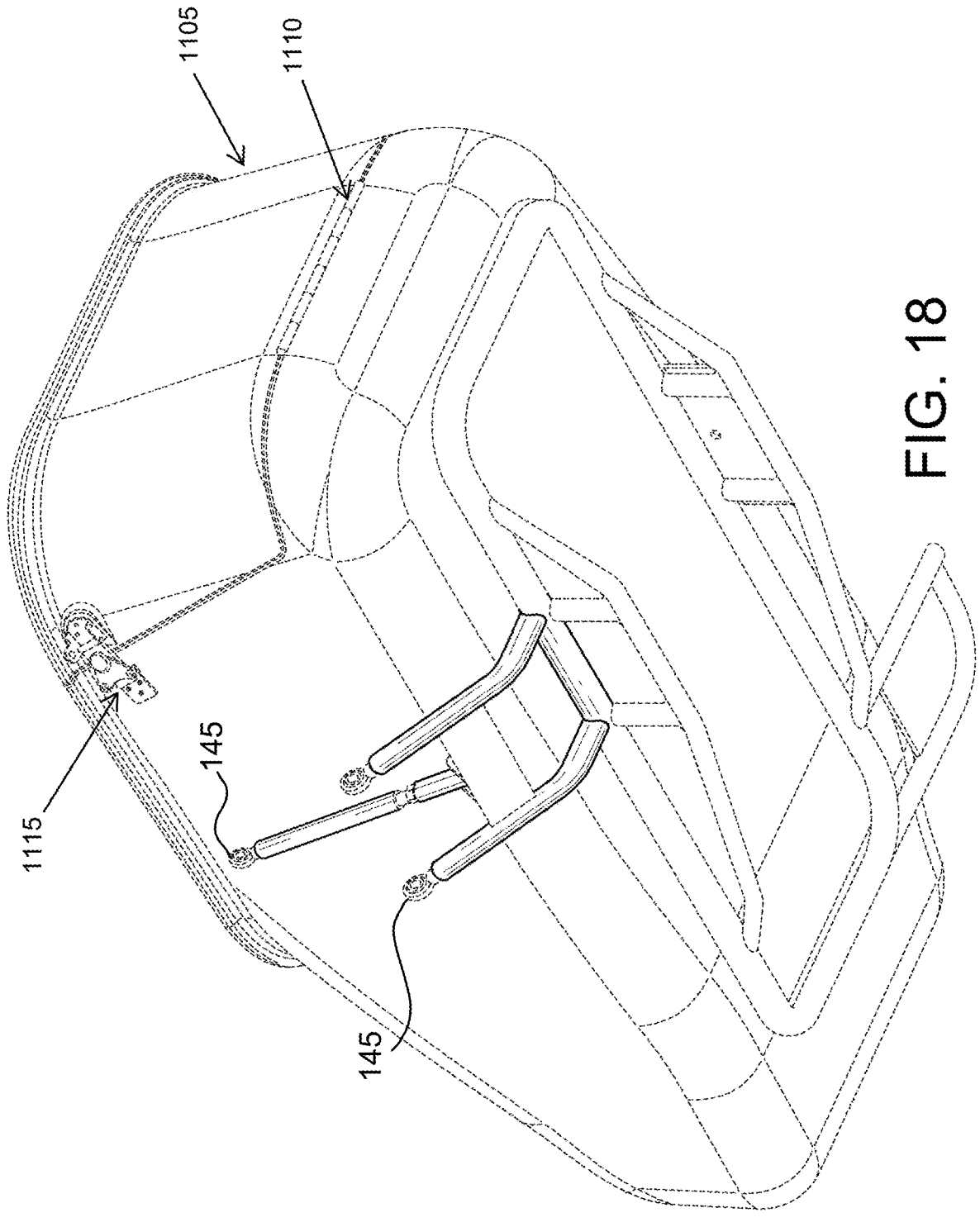
Figure 19:
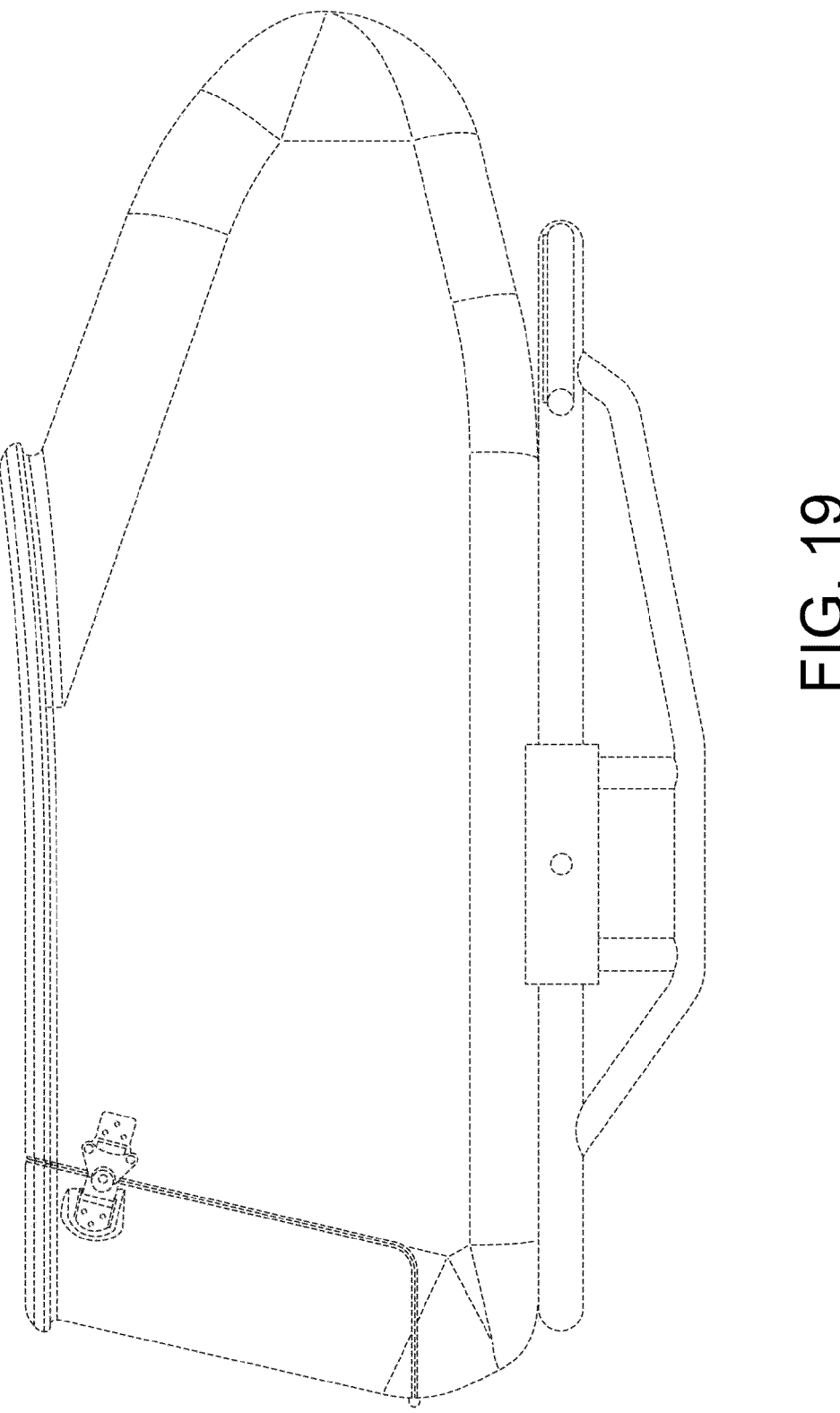
Figure 20:
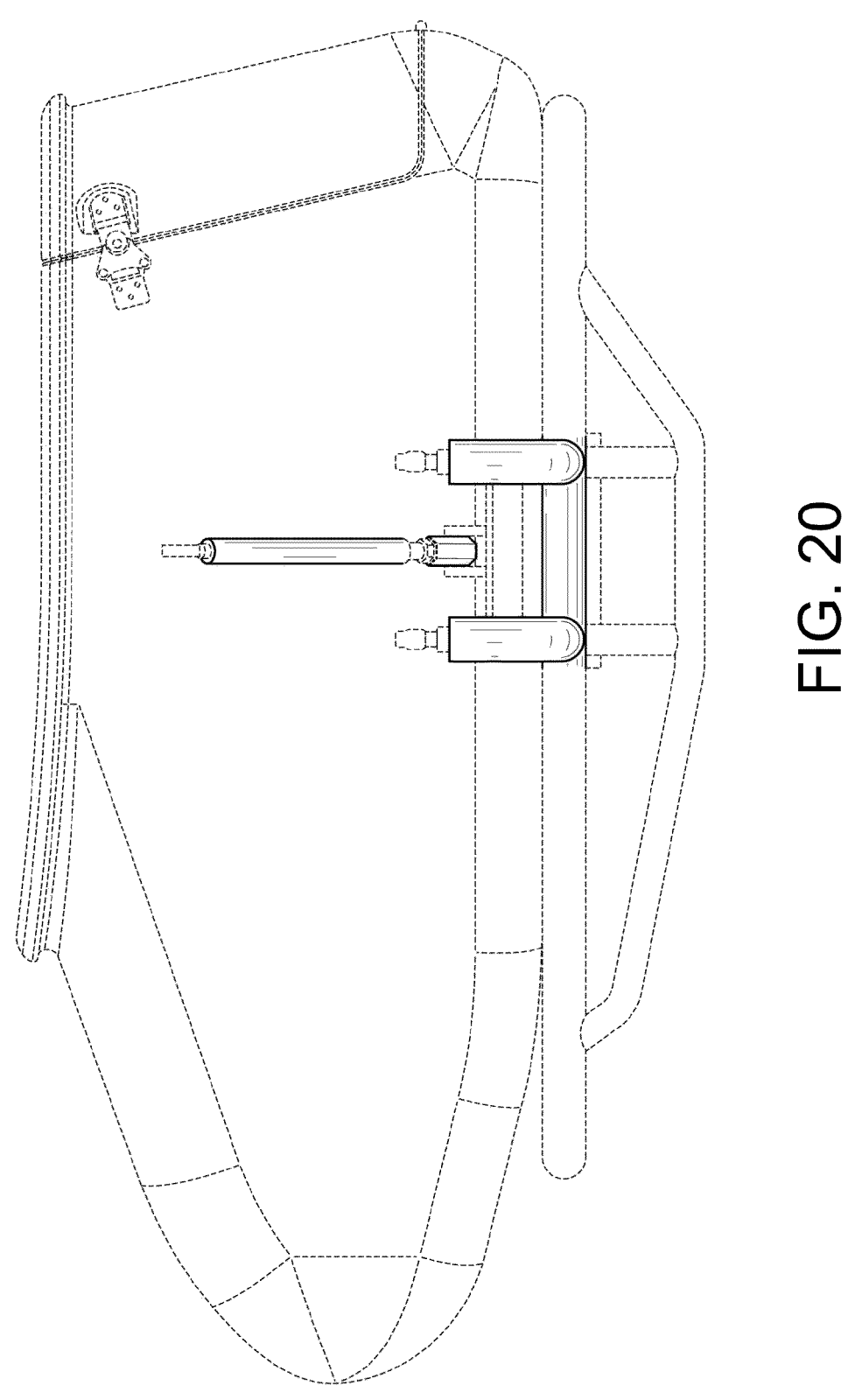
Figure 21:
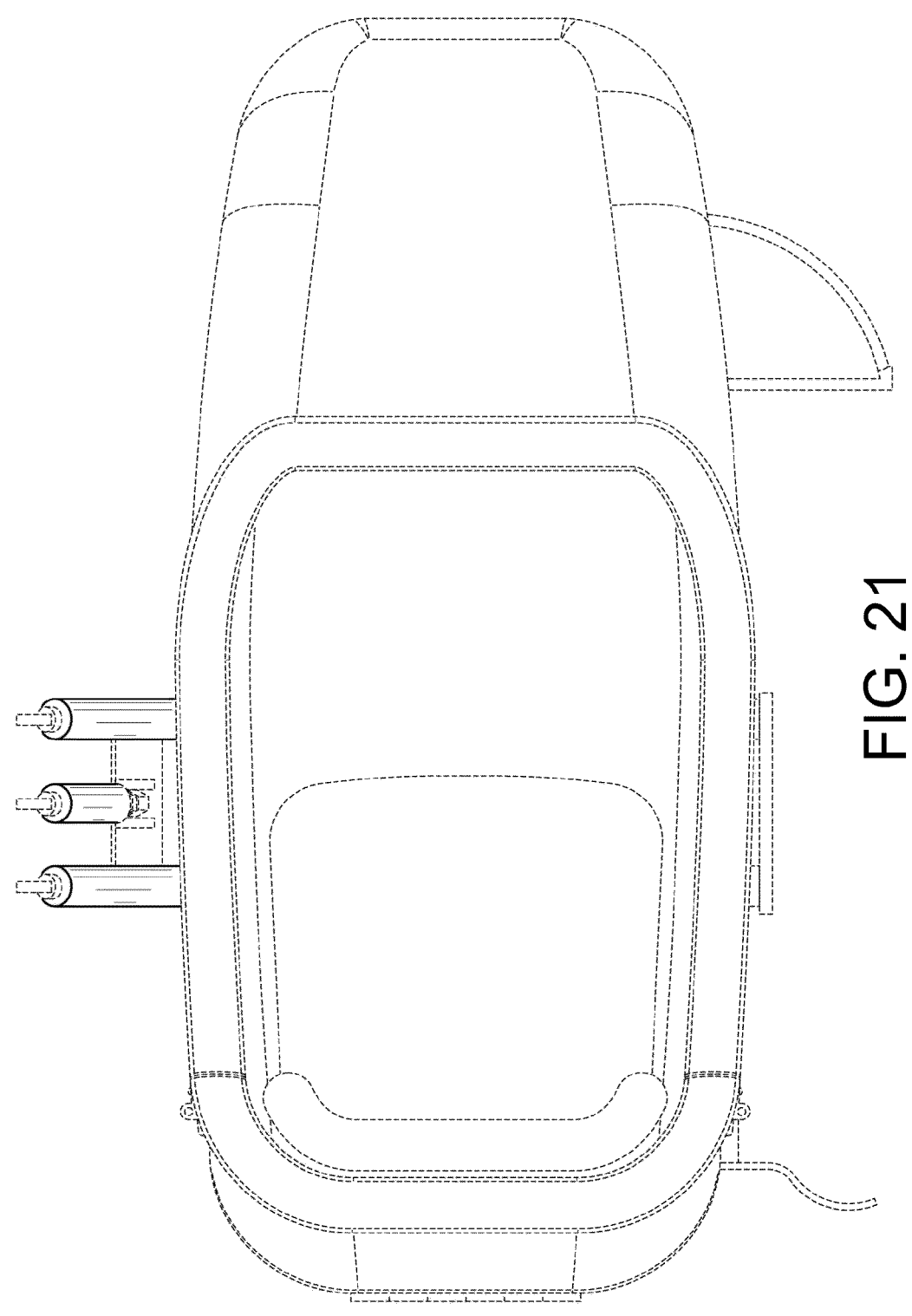
Figure 22:
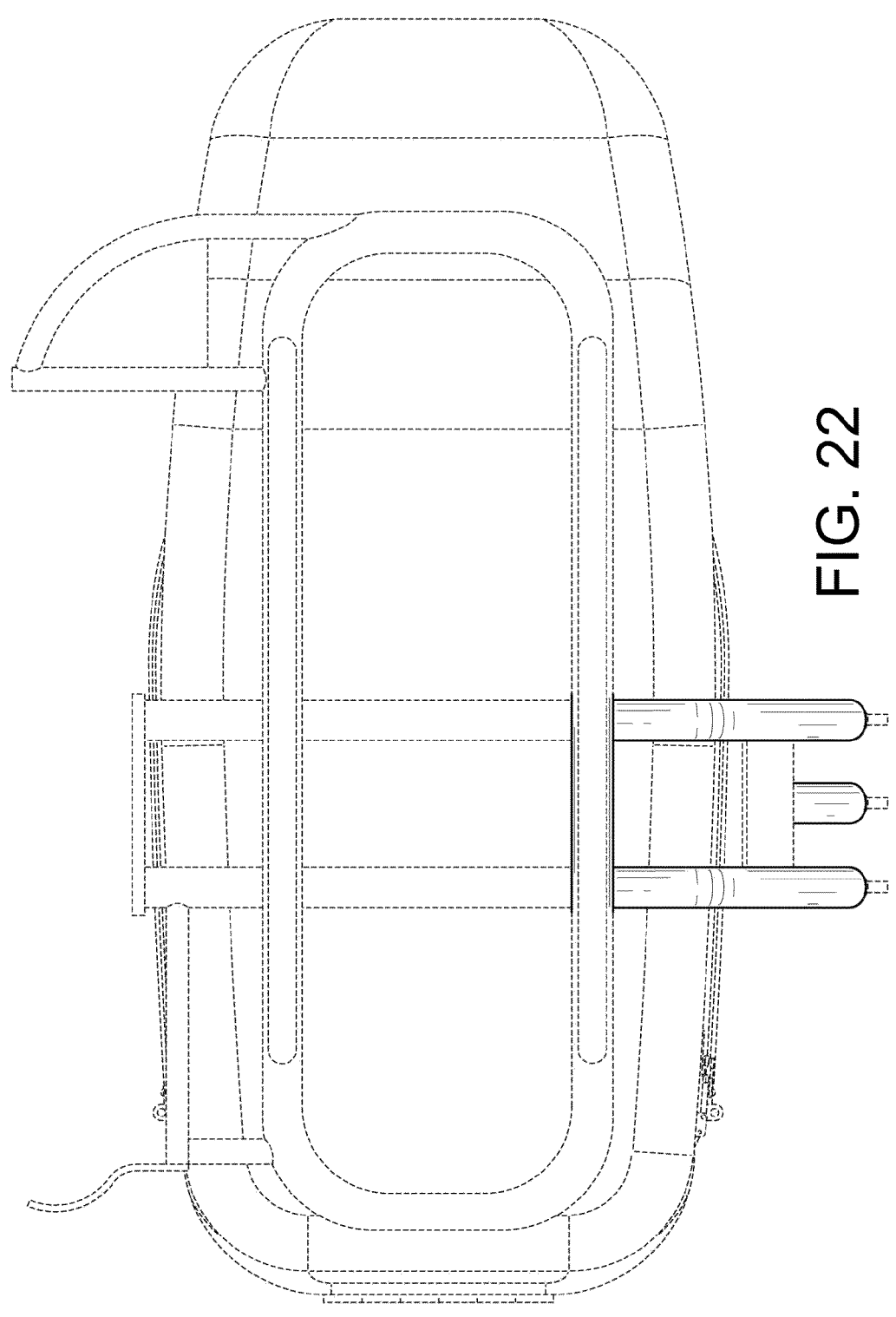

In an illustrative aspect, a sidecar may, for example, include a wheel with an axis of rotation along an axis adjacent to and between a front wheel axis of rotation of a vehicle and a rear wheel axis of rotation of the vehicle. The axis of rotation of the wheel may, for example, be centered below a center of a rear wheel axis of rotation of the vehicle, and a sidecar frame that is coupled to a vehicle frame by at least three arms, wherein at least one of the arms terminates in a multi-axis rotatable socket (e.g., multi-axis socket 145 as depicted in FIGS. 1A and FIG. 18).

At least one of the at least three arms may, for example, be adjustable in length.

At least two of the at least three arms may, for example, be lower arms. The at least two lower arms may, for example, extend from the side car frame along a first axis for a first distance, and then along a second axis, intersecting the first axis, for a second distance, such that, for the second distance, the lower arms angle upward toward a mounting point on the vehicle.

The side car may, for example, be configured to be a pet carrier.

The side car may, for example, be fixedly coupled to the vehicle frame.

The side car may, for example, be releasably coupled to the vehicle frame.

The vehicle may, for example, further include an accessory mounting rack configured to be coupled to a frame of a cycling vehicle. The accessory mounting rack may, for example, include: a multi-modal rack defining a flat surface; a mounting plate comprising a plurality of keyhole apertures all aligned to operably engage in a single direction. The multi-modal rack may, for example, be configured into: a cargo mode to receive a load; and an accessory mode having an auto-locking protrusion configured such that, when a corresponding multiple mounting studs of a mountable accessory is brought into register with and inserted through entry points of the multiple keyhole apertures, the studs are operated in a single direction for a distance where at least one keyhole slot is shorter than a length of the rack, then the auto-locking protrusion registers with and is urged into locking engagement with a corresponding locking feature on the mounting plate.

The accessory mounting rack may, for example, further include a second locking protrusion configured such that, when the auto-locking protrusion is engaged with the corresponding locking feature on the mounting plate, then the second locking protrusion is selectively key-operable into a locked mode in which the second locking protrusion engages a corresponding second locking feature of the mounting plate such that the accessory mounting rack is prevented from being operated in a direction opposite the single direction.

The vehicle may, for example, be an electric motor vehicle. The vehicle may, for example, be configured to be received into a charging station. The charging station may, for example, include a pedestal defining a stowage cavity; a power outlet disposed in the stowage cavity; a door hingedly coupled to the pedestal and configured to selectively close up the stowage cavity; and a locking mechanism. The locking mechanism may, for example, include a first protrusion extending from the pedestal in a first plane and defining a first aperture; a second protrusion extending from the stowage cavity in a second plane and defining a second aperture, wherein, when the door is closing the stowage cavity, the first aperture and the second aperture are aligned and the first plane is parallel to the second plane; and a third protrusion hingedly coupled to the pedestal along a different axis of rotation then the door defining a third aperture is configured such that, when the door is closing the stowage cavity, the first protrusion, and the second protrusion project through the third aperture substantially against opposite sides of the third aperture such that, when an lock is passed through the first and second aperture, the third protrusion is prevented from being hingedly operated sufficiently to permit hinged operation of the door sufficient to open the cavity.

A number of implementations have been described. Nevertheless, it will be understood that various modifications may be made. For example, advantageous results may be achieved if the steps of the disclosed techniques were performed in a different sequence, or if components of the disclosed systems were combined in a different manner, or if the components were supplemented with other components. Accordingly, other implementations are contemplated within the scope of the following claims.

What is claimed is:

1. A side car comprising:
a wheel with an axis of rotation along an axis adjacent to and between a front wheel axis of rotation of a vehicle and a rear wheel axis of rotation of the vehicle, wherein the axis of rotation of the wheel is centered below a center of the rear wheel axis of rotation of the vehicle;
a sidecar frame that is coupled to a vehicle frame by at least three arms such that the vehicle tilts relative to the sidecar frame, wherein:
at least one of the at least three arms terminates in a multi-axis rotatable socket,
at least one of the at least three arms is adjustable in length, and
at least two of the at least three arms are lower arms positioned lower than at least one of the remaining at least three arms; and
a bracket configured to couple to the vehicle and to the each of the at least three arms such that the sidecar frame is releasably and entirely coupled to the vehicle via the bracket.

2. The side car of claim 1, wherein the at least two lower arms extend from the side car frame along a first axis for a first distance, and then along a second axis, intersecting the first axis, for a second distance, such that, for the second distance, the at least two lower arms angle upward toward a mounting point on the vehicle.

3. The side car of claim 1, wherein the vehicle further comprises an accessory mounting rack configured to be coupled to a frame of a cycling vehicle, the accessory mounting rack comprising:
a multi-modal rack defining a flat surface; and,
a mounting plate comprising a plurality of keyhole apertures aligned to operably engage in a single direction, wherein the multi-modal rack is configured to be operated into:
a cargo mode to receive a load;

an accessory mode in which an auto-locking protrusion is configured such that, when corresponding multiple mounting studs of a mountable accessory are brought into register with and inserted through entry points of the plurality of keyhole apertures, the multiple mounting studs are operated in the single direction for a distance, where at least one of the plurality of keyhole apertures is shorter than a length of the multi-modal rack, then the auto-locking protrusion registers with and is urged into locking engagement with a corresponding locking feature such that decoupling of the multi-modal rack from the mounting plate is resisted.

4. The side car of claim 3, wherein the accessory mounting rack further comprises a second locking protrusion configured such that, when the auto-locking protrusion is engaged with the corresponding locking feature on the mounting plate, then the second locking protrusion is selectively key-operable into a locked mode in which the second locking protrusion engages a corresponding second locking feature of the mounting plate such that the accessory mounting rack is prevented from being operated in a direction opposite the single direction.

5. The side car of claim 1, wherein the side car is releasably coupled to the vehicle frame.

6. The side car of claim 1, wherein the vehicle is an electric motor vehicle.

7. The side car of claim 5, wherein the vehicle is configured to be received into a charging station.

8. The side car of claim 7, wherein the charging station comprises:

a pedestal defining a stowage cavity;

a power outlet disposed in the stowage cavity;

a door hingedly coupled to the pedestal and configured to selectively close up the stowage cavity; and, a locking mechanism comprising:

a first protrusion extending from the pedestal in a first plane and defining a first aperture; and, a second protrusion extending from the stowage cavity in a second plane and defining a second aperture, wherein, when the door is closing the stowage cavity, the first aperture and the second aperture are aligned and the first plane is parallel to the second plane; and a third protrusion hingedly coupled to the pedestal along a different axis of rotation then the door defining a third aperture is configured such that, when the door is closing the stowage cavity, the first protrusion, and the second protrusion project through the third aperture substantially against opposite sides of the third aperture such that, when a lock is passed through the first and second aperture, the third protrusion is prevented from being hingedly operated sufficiently to permit hinged operation of the door sufficient to open the stowage cavity.

9. A side car comprising:

a wheel with an axis of rotation along an axis adjacent to and between a front wheel axis of rotation of a vehicle and a rear wheel axis of rotation of the vehicle, wherein the axis of rotation of the wheel is centered below a center of the rear wheel axis of rotation of the vehicle; and, a sidecar frame that is coupled to a vehicle frame by at least three arms such that the vehicle tilts relative to the sidecar frame, wherein at least one of the at least three arms terminates in a multi-axis rotatable socket.

10. The sidecar of claim 9, wherein at least one of the at least three arms is adjustable in length.

11. The sidecar of claim 9, wherein at least two of the at least three arms are lower arms.

12. The side car of claim 11, wherein the at least two lower arms extend from the side car frame along a first axis for a first distance, and then along a second axis, intersecting the first axis, for a second distance, such that, for the second distance, the at least two lower arms angle upward toward a mounting point on the vehicle.

13. The side car of claim 9, wherein the side car is configured to be a pet carrier.

14. The side car of claim 9, wherein the side car is fixedly coupled to the vehicle frame.

15. The side car of claim 9, wherein the side car is releasably coupled to the vehicle frame.

16. The side car of claim 9, wherein the vehicle further comprises an accessory mounting rack configured to be coupled to a frame of a cycling vehicle the accessory mounting rack comprising:

a multi-modal rack defining a flat surface; and, a mounting plate comprising a plurality of keyhole apertures all aligned to operably engage in a single direction, wherein the multi-modal rack may be configured into:

a cargo mode to receive a load, and an accessory mode in which an auto-locking protrusion is configured such that, when corresponding multiple mounting studs of a mountable accessory are brought into register with and inserted through entry points of the plurality of keyhole apertures, the multiple mounting studs are operated in the single direction for a distance where at least one of the plurality of keyhole apertures is shorter than a length of the multi-modal rack, then the auto-locking protrusion registers with and is urged into locking engagement with a corresponding locking feature such that decoupling of the multi-modal rack from the mounting plate is resisted.

17. The side car of claim 16, wherein the accessory mounting rack further comprising a second locking protrusion configured such that, when the auto-locking protrusion is engaged with the corresponding locking feature on the mounting plate, then the second locking protrusion is selectively key-operable into a locked mode in which the second locking protrusion engages a corresponding second locking feature of the mounting plate such that the accessory mounting rack is prevented from being operated in a direction opposite the single direction.

18. The side car of claim 9, wherein the vehicle is an electric motor vehicle.

19. The side car of claim 18, wherein the vehicle is configured to be received into a charging station.

20. The side car of claim 19, wherein the charging station comprises:

a pedestal defining a stowage cavity;

a power outlet disposed in the stowage cavity;

a door hingedly coupled to the pedestal and configured to selectively close up the stowage cavity; and a locking mechanism comprising:

a first protrusion extending from the pedestal in a first plane and defining a first aperture; and, a second protrusion extending from the stowage cavity in a second plane and defining a second aperture, wherein, when the door is closing the stowage cavity, the first aperture and the second aperture are aligned and the first plane is parallel to the second plane; and a third protrusion hingedly coupled to the pedestal along a different axis of rotation then the door defining a third aperture is configured such that, when the door is closing the stowage cavity, the first protrusion, and the second protrusion project through the third aperture substantially against opposite sides of the third aperture such that, when a lock is passed through the first and second aperture, the third protrusion is prevented from being hingedly operated sufficiently to permit hinged operation of the door sufficient to open the stowage cavity.

21. The side car of claim 12, wherein a portion of the sidecar frame that the at least two lower arms extend from is disposed beneath a body of the sidecar.

22. The side car of claim 9, wherein the sidecar is coupled to the vehicle frame by the at least three arms coupled to the vehicle frame, and the at least three arms coupled to the vehicle frame are coupled via a single mounting bracket releasably coupled to the vehicle frame.

23. The side car of claim 22, wherein the mounting bracket is fastened to the vehicle frame at an angle intersecting a vertical axis of the vehicle frame.

24. The side car of claim 16, wherein the mounting plate comprises the auto-locking protrusion, and the multi-modal rack comprises the corresponding locking feature.

25. The side car of claim 9, wherein another at least one of the three arms is fixedly coupled to the sidecar frame.

* * * * *